United States Patent [19]

Nakai et al.

[11] Patent Number: 5,737,308
[45] Date of Patent: Apr. 7, 1998

[54] RECORDING MEDIUM FOR SPECIFIED REPRODUCTION AND REPRODUCTION APPARATUS

[75] Inventors: Masatoshi Nakai, Kawasaki; Mitsutaka Kuwabara, Fukaya, both of Japan

[73] Assignee: Kabushiki Kaisha Toshiba, Kawasaki, Japan

[21] Appl. No.: 464,837

[22] PCT Filed: Oct. 26, 1994

[86] PCT No.: PCT/JP94/01794

§ 371 Date: Jun. 27, 1995

§ 102(e) Date: Jun. 27, 1995

[87] PCT Pub. No.: WO95/12201

PCT Pub. Date: May 4, 1995

[30] Foreign Application Priority Data

Oct. 29, 1993 [JP] Japan .................... 5-271640

[51] Int. Cl.$^6$ .................................................. G11B 7/00
[52] U.S. Cl. ...................... 369/275.2; 369/47; 369/59; 369/60
[58] Field of Search ..................... 369/275.2, 275.3, 369/275.4, 275.1, 58, 59, 60, 47, 48, 49, 50, 53, 54, 32, 124

[56] References Cited

U.S. PATENT DOCUMENTS 5,231,239  7/1993  Tsumura et al. .
5,359,583  10/1994 Jung ............................ 369/58 X
5,402,398  3/1995  Yoshida ......................... 369/32
5,410,524  4/1995  Takeya ......................... 369/32

FOREIGN PATENT DOCUMENTS

| 0 380 746 | 8/1990 | European Pat. Off. . |
| 0 529 834 | 3/1993 | European Pat. Off. . |
| 3245174 | 10/1991 | Japan . |
| 5-12831 | 1/1993 | Japan . |

OTHER PUBLICATIONS

Yoshiaki, "Optical Disk Controller", Patent Abstracts of Japan, Patent No. 3037710.

*Primary Examiner*—Muhammad N. Edun
*Attorney, Agent, or Firm*—Cushman, Darby & Cushman IP Group of Pillsbury Madison & Sutro LLP

[57] ABSTRACT

It is easy to reproduce a recorded information and, particularly, its portions on a disc, in a repeated fashion and the disc is convenient to learn. It is proved effective to perform reproduction, while picking up only a specified portion of a plurality of programs in the recorded information on the disc, and to conduct a search for a program while viewing it. The disc (100) includes a plurality of programs recorded thereon and voice information written in an order of phrase units, chorus units and sentence units. A reproduction apparatus is of such a type that, upon detecting the flag, an address of corresponding voice information is recorded and updated and, upon the entry of a repeat command, a shift is made back to the address so that repeat reproduction may be made.

21 Claims, 20 Drawing Sheets

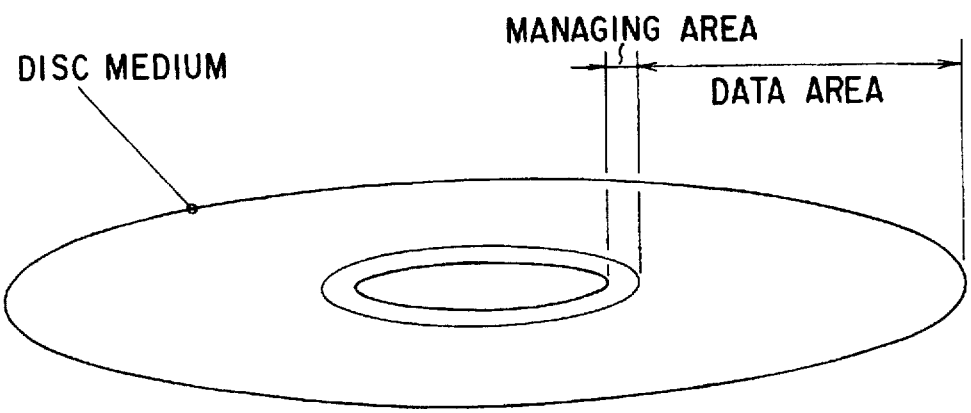
F I G. 2A
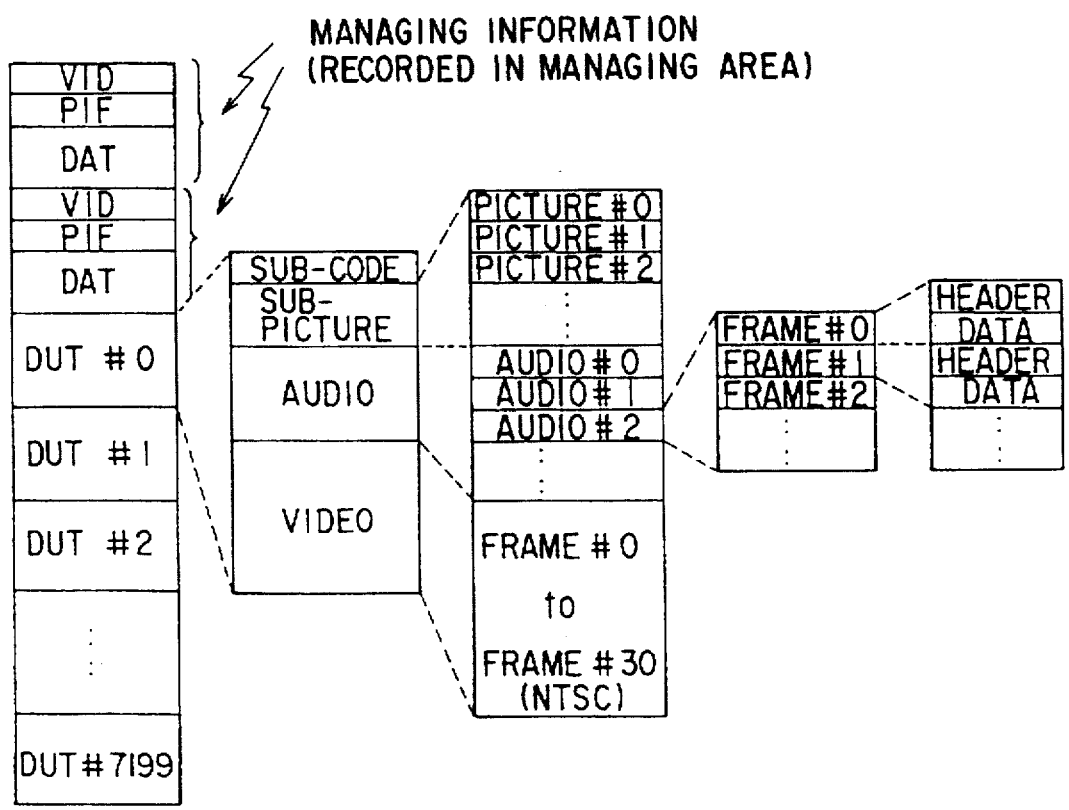
F I G. 2B

CORRESPONDENCE TABLE OF CONTENTS CODE IN (VID) AND LANGUAGE CODE

| CONTENT CODE | LANGUAGE CODE |
| --- | --- |
| 0 | NON-LANGUAGE |
| 1 | ENGLISH |
| 2 | JAPANESE |
| 3 | FRENCH |
| 4 | GERMAN |
| ⋮ | ⋮ |

FIG. 3A

CORRESPONDENCE TABLE OF DATA STRING NO. IN (PIF) AND CONTENTS CODE

| DATA STRING NO. | CONTENTS CODE |
| --- | --- |
| #0 | 1 (D1+B&M) |
| #1 | 3 (D3) |
| #2 | 2 (D2) |
| #3 | 0 (B&M) |
| ⋮ | ⋮ |

FIG. 3B

MEANING OF CONTENTS CODE

| CONTENTS CODE | CONTENTS | |
| --- | --- | --- |
| 0 | B&M | ENVIRONMENTAL SOUND & TONIC |
| 1 | D1+B&M | CONVERSATION IN FIRST LANGUAGE AND TONIC |
| 2 | D2 | CONVERSATION IN SECOND LANGUAGE |
| 3 | D3 | |
| ⋮ | ⋮ | ⋮ |
| 7 | D7 | |

MOVING PICTURE

| DATA STRING | 0 | B&M |
|---|---|---|
| | 1 | D1+B&M |
| | 2 | D2 |
| | 3 | D3 |
| | ⋮ | |
| | 7 | D7 |

FIG. 4B

KARA-OK

| DATA STRING | 0 | KARA-OK |
|---|---|---|
| | 1 | D1 |
| | 2 | D2 |
| | 3 | D3 |
| | ⋮ | |
| | 7 | D7 |

FIG. 4C

KARA-OK

| DATA STRING | 0 | KARA-OK |
|---|---|---|
| | 1 | GUIDE VOCAL |
| | 2 | MELODY LINE |
| | 3 | DUET (L,R) |
| | ⋮ | |
| | 7 | |

```
#0    ENGLISH           ── ENGLISH DISPLAY
#1    ---------         ── FRENCH DISPLAY
#2    ---------         ── JAPANESE DISPLAY
#3    ---------         ── KARA-OK
#4    ---------
 :
#7    ---------
```

FIG. 8A

```
                    PROGRAM
#0 ---------   #20 ---------   #30 ---------
#1 ---------   #21 ---------   #31 ---------
#2 ---------   #22 ---------   #32 ---------
 :   ---------   :               :
```

FIG. 8B

```
#0    KARA-OK
#1    GUIDE VOCAL
#2    MELODY LINE
 :
#7
```

FIG. 8C

| PIF | | HEAD INFORMATION |
|---|---|---|
| DATA STRING 0 | KARA-OK | |
| 1 | D1 | D1S |
| 2 | D2 | D2S |
| 3 | D3 | D3S |
| ⋮ | ⋮ | ⋮ |
| | D7 | |

F I G. 11A

DAT

| DATA UNIT NO. | LINK POINTER | ZONE NO. | TRACK NO. | SECTOR NO. |
|---|---|---|---|---|
| | | | | |
| | | | | |
| #5 (D2S) | #6 | | | |
| #6 | #7 | | | |
| | | | | |
| #31 | #37 | | | |
| #37 | #38 | | | |

F I G. 11B

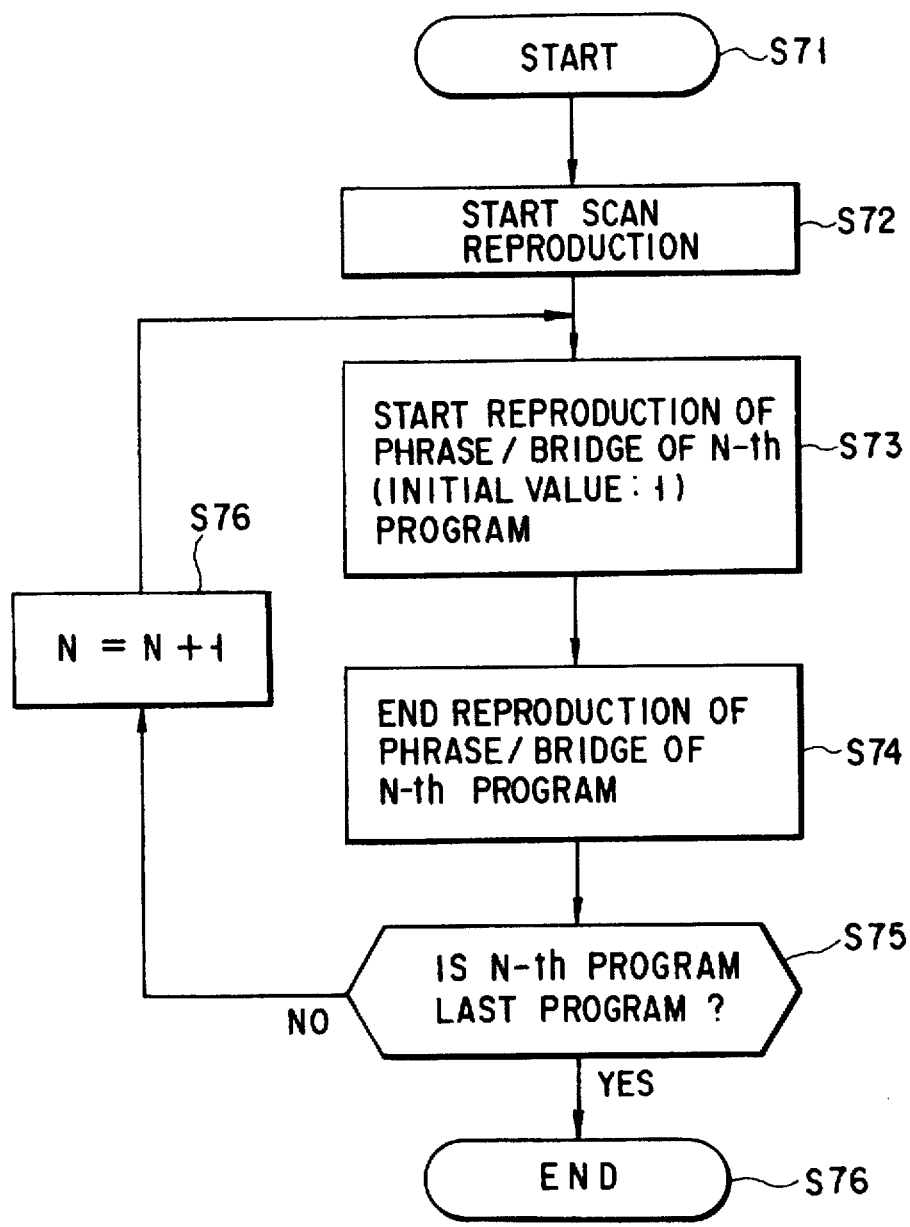
F I G. 14

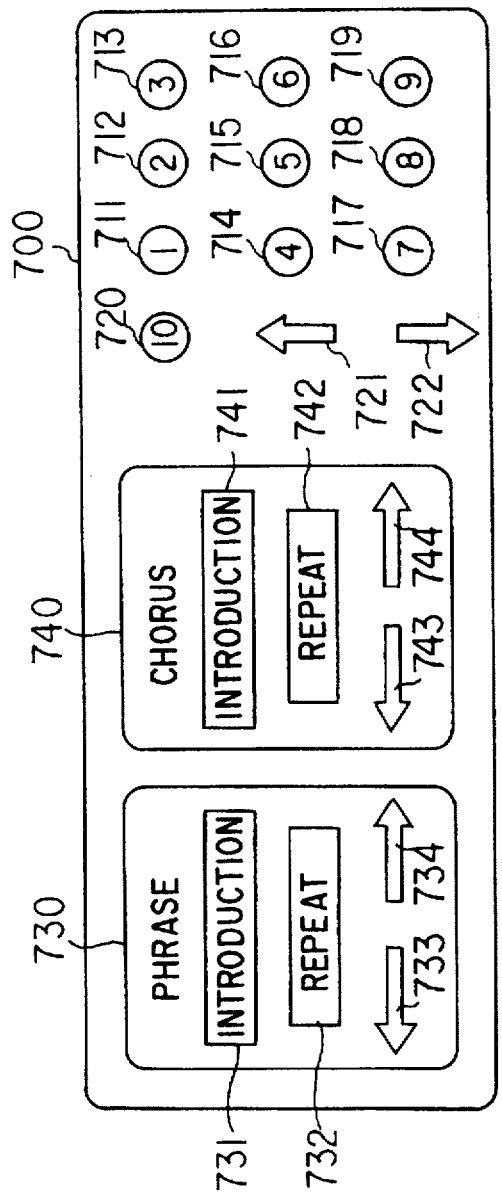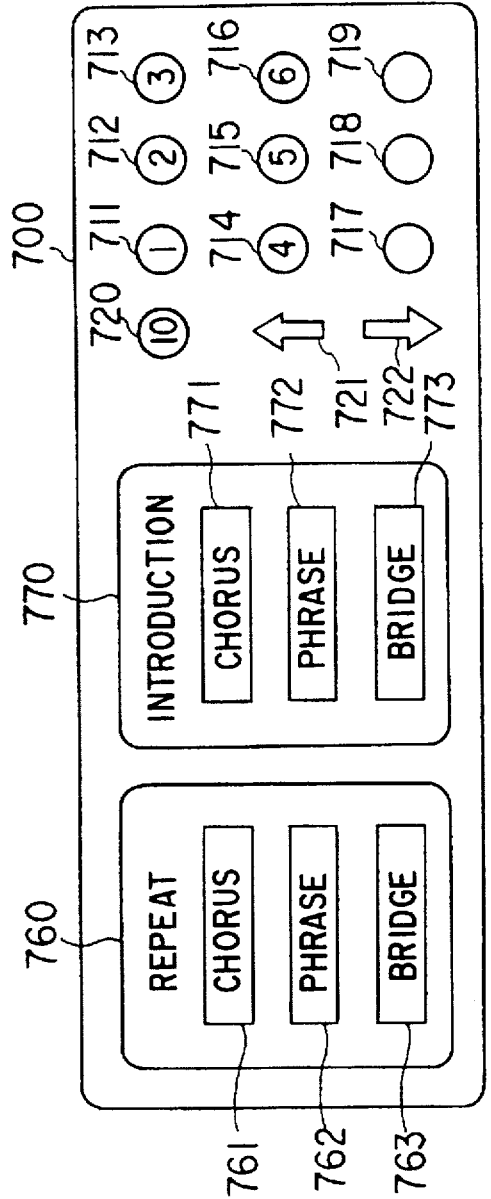
FIG. 17A
FIG. 17B

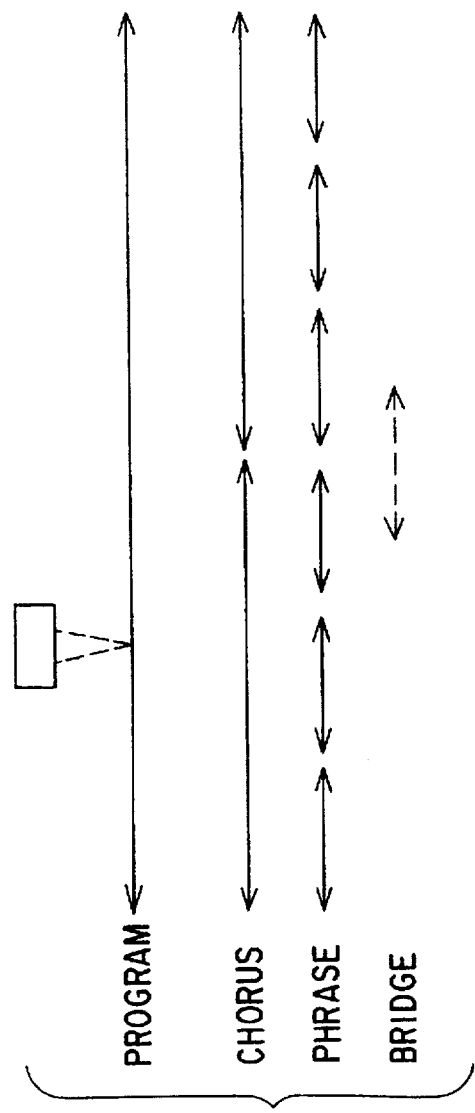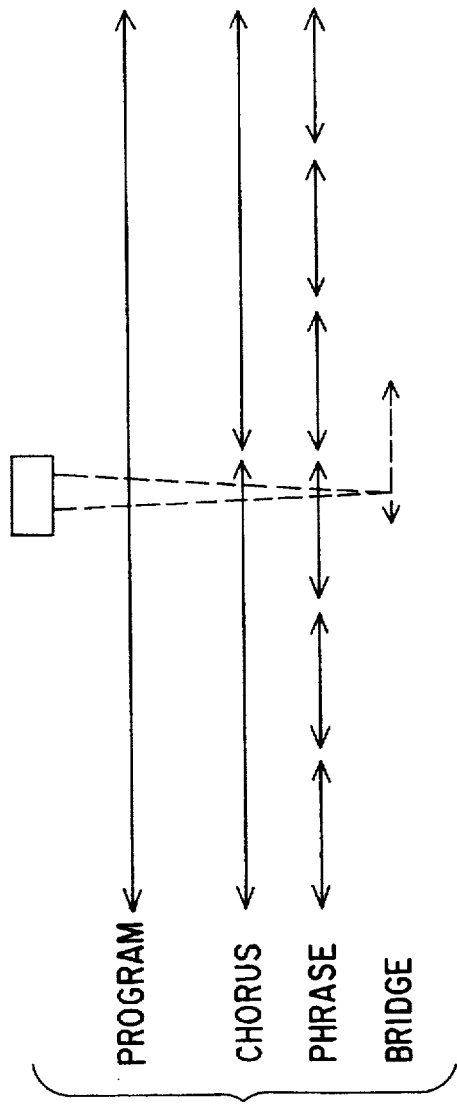

RECORDING MEDIUM FOR SPECIFIED REPRODUCTION AND REPRODUCTION APPARATUS

TECHNICAL FIELD

The present invention relates to a recording medium for specified reproduction, such as an optical disc, for recording information thereon for a moving picture, kara-ok, education program and the like, as well as comments, subtitles, voice information in various languages, and for allowing a voice and subtitles (characters) to be selected in any language, and an associated reproduction apparatus.

BACKGROUND ART

Conventionally, a disc for a kara-ok system includes one background image, subtitle information in one language and music information to be played back as recorded information.

In recent years, however, the markets for such a system have spread out world-wide and various demands have also been made for it to be available in different languages. Further, even when kara-ok software is to be exported, it has to be manufactured in its own country's language and much cost is required on the manufacturer's side. There are sometimes cases where a song is practiced repeatedly on the kara-ok system. However, when the reproduction of any given song is started, it has to be played back until the program has ended, so that some inconvenience is involved in the case where a selected phrase is to be practiced repeatedly.

It is accordingly the object of the present invention to provide a recording medium for specified reproduction and a reproduction apparatus which can ensure the easiness with which a particular portion of recorded information on the disc can be played back repeatedly and can provide convenience to a learner.

Another object of the present invention is to provide a recording medium for specified reproduction and a reproduction apparatus which can play back, while picking up, any specified portions of a plurality of programs of recorded information on the disc and which can conduct a program search while under an audiovisual condition.

DISCLOSURE OF THE INVENTION (A1) In the present invention, a disc includes a managing area recorded as one area of the disc and a data area recorded as the other area, the data area including a plurality of data units, the data units having a block with audio information and the audio information having a flag for representing a given demarcation mark of voice information, and the managing information having address information for the respective data units.

(A2) In the present invention, a disc includes a managing area recorded as one area of the disc and a data area recorded as the other area, the data area having a plurality of programs, each respective program constituting a plurality of data units, the data unit including a block for audio information, and the managing area having address information for the respective data units and search address information for searching each specified portion of the programs.

(A3) A reproduction apparatus of the present invention comprises a pickup means for reading the information from the above-mentioned disc, demodulating means for demodulating an output signal from the pickup means, managing information storing means for storing the managing information which is output from the demodulating means, audio processing means for decoding the above-mentioned audio information which is output from the demodulating means, memory means for storing, as a flag position address by reference to the stored address of the managing information storing means, an address of the data unit being reproduced when the flag of the audio information from the demodulating means is detected, and means for, when a repeat request signal is entered, changing a reproduction position on the disc on the basis of the flag position address.

(A4) Further, a reproduction apparatus of the present invention comprises pickup means for reading the information on the above-mentioned disc, demodulating means for demodulating an output signal from the pickup means, managing information storing means for storing the above-mentioned information which is output from the demodulating means, audio processing means for, when a search request signal for searching for the above-mentioned specified portion is entered, controlling the pickup means while referring to the search address information of the managing information storing means, and for reproducing the specified portion of the specified programs, and means for, when the search request signal is turned OFF, displaying distinction information in a program now being reproduced.

By using the above-mentioned means it is possible to ensure the easiness with which a specified portion of the recorded information on the disc is reproduced repeatedly to give convenience to a learner. It is also proven effective to reproduce the information only while picking up a specified portion of a plurality of programs in the recorded information on the disc and to conduct a program search while under an audiovisual display condition.

BRIEF DESCRIPTION OF THE DRAWINGS

FIG. 2A is a view showing a disc according to one embodiment of the present invention, and FIG. 2B is an explanatory view showing a data format on the disc;

FIGS. 3A to 3C show examples of managing information on the disc;

FIGS. 4A to 4C, similarly, show examples of managing information on the disc;

FIGS. 8A to 8C are views for one form of a display screen of a monitor on the reproduction apparatus;

FIGS. 11A and 11B are views showing an example of managing information on the disc;

FIG. 14 is a view for showing signal processing steps of realizing a scan reproduction of a bridge part;

FIGS. 17A and 17B, each, are views showing another form of an operation section on a reproduction apparatus of the present invention;

FIGS. 20A and 20B are views showing an example of a reproduction mode display means added to the reproduction apparatus of the present invention.

BEST MODE OF CARRYING OUT THE INVENTION

The embodiment of the present invention will be explained below with reference to the accompanying drawings.

Figure 1:
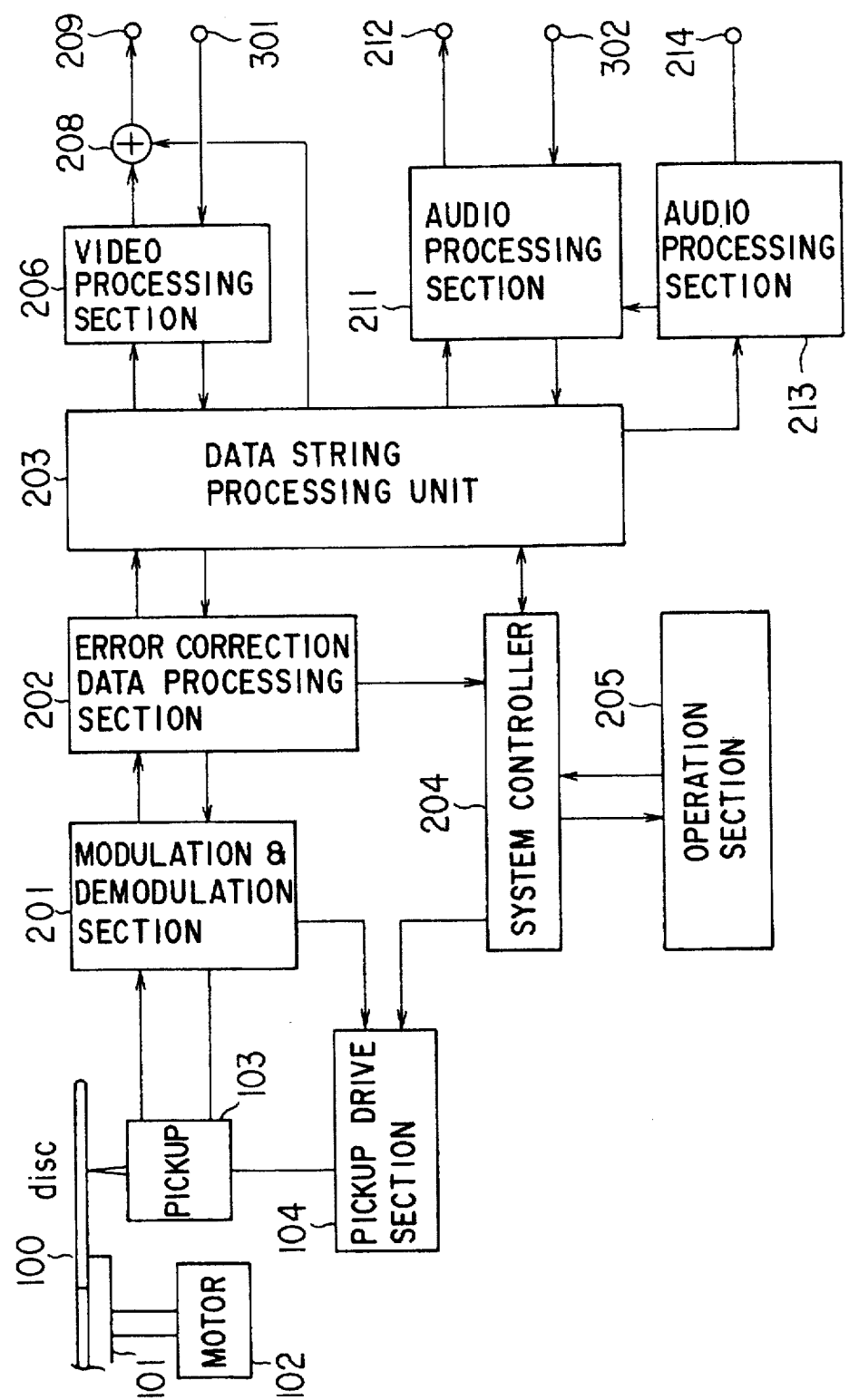
FIG. 1 is a view showing a reproduction apparatus according to one embodiment of the present invention.

FIG. 1 shows a recording medium (for example, an optical disc: hereinafter referred to simply as a disc) 100 loaded into a recording/reproducing apparatus (accessing apparatus).

The disc 100 is placed on a turntable 101 and rotatably driven by a motor 102. In a playback mode, information recorded on the disc 100 is picked up by a pickup means 103. The shift-and tracking-control of the pickup means 103 are achieved by a pickup drive section 104. The output of the pickup means 103 is input to a modulating/demodulating section 201 for demodulation. Demodulated data obtained through demodulation is input to an error correcting/data processing section 202 to have its error corrected. After the error correction, the output of the section 202 is input to a data string processing section 203. The data string processing section 203 separates and derives video information, superimposed subtitle- and text-information and audio information from an input. This means that the subtitle- and text-information and audio information are recorded on the disc 100 in a way to correspond to the video information. In this case, for the subtitle and text information and audio information, various languages can be selected and selection can be made under control of a system controller 204. An input is supplied to the system controller 205 through an input operation by a user.

The video information separated by the data string processing section 203 is input to a video processing section 206 and decoding processing is carried out in accordance with a system of a display device. The processing is performed through conversion to, for example, NTSC, PAL, SECAM, wide screen format and so forth. The video signal decoded by the video processing section 206 is input to an adder 208 where it is additively combined with the subtitle and text information. The resultant output of the addition operation is delivered to an output terminal 209. The audio information selectively separated by the data string processing section 203 is input to an audio processing section 211 and, after demodulation, delivered to an output terminal 212.

An audio processing unit serving as a decoding unit has not only the audio processing section 211 but also another audio processing section 213 and can play back a voice in other languages and deliver it to an output terminal 214.

For example, audio information containing language information in various languages corresponding to the video information as well as music information and environmental music information are recorded on the disc 100 used in the present invention. Further, subtitle information in various languages is also recorded. The determination of which language information in any of these information items should be played back is made by a data string control means structured by the voice data string processing section 203, system controller 204 and operation section 205.

An explanation will be given below about the disc used in the present invention, the recording formats, the way to utilize these, and so on.

FIG. 2A shows information areas on the optical disc 100. A managing area is located in an inner circumferential area of the optical disc 100 and a data area is located on an outer circumferential area outside the managing area. Managing data for managing the data on the data area as explained below is recorded on the managing area. Sub-code, sub-picture, audio, video, etc., information items are recorded on the data area.

With reference to FIG. 2B, an explanation will be made about which information is written on the data area.

FIG. 2B shows expanded contents of a data unit DUT#0 in the data area. The data unit DUT#0 contains a sub-code (SUB-CODE) at its head, sub-picture (SUB-PICTURE), audio (AUDIO) and video (VIDEO) information sequentially. The sub-code (SUB-CODE) is attribute information of the DUT#0. The sub-picture (SUB-PICTURE) is, for example, subtitle information (in the case where the video is a moving picture) and text information (in the case where the video is, for example, kara-ok, education video, etc.). The subtitle information and text information are PICTURE #0 to #7 and a different language is used for each of these, or alternatively some portions could differ in language, allowing the remaining portions to constitute a silent signal portion. Audio (AUDIO) information items are written in different languages, that is, a maximum of eight languages AUDIO #0 to #7. The AUDIO information items are written in frame units and the respective frames #0, #1, are comprised of a header (HEADER) and data (DATA). The video (VIDEO) information contains frame units corresponding to 30 frames (about 1 second upon playback) in the case of moving pictures. The video (VIDEO) information items are written by a high efficiency coded image compression technique. Though the number of frames is dependent upon the standard, the number of frames is not restricted. Further, the processing, such as PCM modulation, is carried out for the audio information.

Since, as set out above, a plurality of languages are recorded on the optical disc, at least two decoders are incorporated into a reproduction apparatus with respect to voice playback, and any combination can be obtained. For an expensive type of apparatus, it may be possible to increase the number of video decoders and voice decoders and the number of subtitle and text-information items.

An explanation will be given below about the managing information recorded on the managing areas. The managing information is arranged in tables.

For the managing table, a volume identity field (VID) on the innermost circumferential portion of the disc is followed by a picture information field (PIF) on the outer circumferential portion of the VID, followed by a data unit allocation table (DAT) on the outer circumferential portion of the DAT.

VID has bytes written in a way starting with a head byte of the managing table area and shows various data information, etc., relating to the whole disc using 256 bytes. The information is, for example, that relating to a normal recording disc, a playback only disc, etc.

A world language code is defined as shown in FIG. 3A. In order to indicate which language is recorded on the data area, the table is structured so that the language code corresponds to content codes "0", "1", . . . , "8". In the example of this disc, the content code "0" corresponds to an environmental sound and music (B&M), not the language, "2" to an English language, "3" a French language and "4" a German language and, in this way, the content code is made to correspond to the respective language code. When the VID is read out, it is possible to understand a correspondence between the content code and the language code.

On the other hand, bit data strings are defined on the PIF table. That is, the content code is made to correspond to data string numbers #0 to #7 on the disc (FIG. 3B). If, here, the data string number is selected, the content code is determined and a language code is also determined in accordance with the content code.

When, therefore, the data is read out from the PIF table, the reproduction system enables a first menu image plane to be displayed on the monitor screen and respective languages to be displayed in accordance with the data string numbers #0 to #7 (display by the key display signal). It is thus possible to effect display in the respective languages (display by the user recognition display signal). This display is made by, for example, sending a language code (FIG. 3A) to the conversion table and generating display data corresponding to the respective language code. Here, the user can select a world language understandable to him or her.

This selection may be made by entering key information of any of the data string numbers #0 to #7 (user recognition key information display signal) while the information is being displayed in the user recognition language.

If #0 selected by the user, for example, it corresponds to the content code "1" shown in FIG. 3 and, at this time, D1 (namely an English language) is selected as a corresponding voice. With #2 selected by the user, D2 (a Japanese language) is selected as a corresponding voice.

With the language of the user so selected, producer's comments are displayed in the selected language. A data address having the comment information recorded thereon is entered, for example, in the VID table. The comments information is displayed in the user recognition language and, in a second menu image plane as will be set out below, done so in the language selected on a first menu image plane. When the #2 is selected by the user on the first menu image plane, the comments are made in the Japanese language. The comments are, for example, the producer's greeting and intention and production date of a disc and, in the case of a moving picture, a program time and so on. Further, at a time of display on the image screen, a proper time is given to the user as to how the output mode of the voice and subtitle should be selected. At such a selection time, for example, it is possible to use voice and subtitle change buttons, for example, at the operation section. With the voice change button depressed, a cursor emerges on the image screen and, with each button depression, is moved to a blank section or a Japanese, an English, a German language section, etc. in a language column. When the cursor is moved to a desired section, the button operation is stopped and, after a lapse of a given time, a mode corresponding to that section is selected. The same is true of the case where the subtitle change button is depressed.

When the display is kept for a predetermined time period without operating any of the voice select buttons and subtitle change buttons, the display is shifted to a playback mode with the voice selected on the first menu image plane. Further, the voice outputting mode and subtitle display mode can be changed on the reproduction apparatus side during any portion of a program being run.

Various data information items for respective programs are recorded on the PIF. For example, 16 bytes are used for each program. The data information includes the start and end times of a program, programs for home video, moving picture, music, kara-ok, computer graphics, interactives and games as well as computer data and programs, distinction information of a voice-coded system and of a video coded system and picture attributes, that is, information for distinguishing between an aspect ratio, PAL, NTSC, etc., system, and information for image plane horizontal resolution, image plane vertical resolution, etc. Further, a start pointer is provided for recording a pointer value indicating the address (data unit number) of a DAT for reserving a data unit of a program's start point.

The DAT records tabulated information showing the order in which data is read out of data areas when a program to be played back is determined and distinguished.

The parameters on the table of DAT include a zone number (NZON), sector number (NSTC), track number (NTRC), program time (PTMB) and link pointer (PNTL). By looking to the zone number, track number, and sector number, it is possible to know a record sector of a head of the data unit. NZON is the zone number to which the record sector of the data unit's head belongs. The zone number is attached to zones divided with a plurality of tracks as a unit in a radial direction from a record inner circumferential portion. That is, in the data area, a reference position R1 is present at a radius of a given angle of the disc and the number is sequentially assigned starting from the number 0 with the reference position R1 as a reference. One zone is comprised of many track portions. NSTC shows the sector number of the track portions. The sector numbers are not consecutive numbers relating to other tracks and zones, but those numbers are self-completed in the zone. NTRC shows the track numbers in the zone. Further, PTMB shows a flag representing the temporal position information of the video data (one picture) of the head of the data unit, the contents thereof showing a relative elapse time (in seconds) from the start point of the program. The temporal position information is used when a time code search is conducted. The temporal position information is taken into the reproduction apparatus side, where the time, absolute time, remaining amount, etc., of a program are to be displayed, and it is used as a start reference data. PNTL shows a flag for representing a next data unit number temporally continuous with a present data unit number. The unit corresponds to a data unit number and, in the case where there is no link destination at the end point of the program, etc. those bits become full bits "1" (=OXFFFF). The effective value as a link pointer becomes OXOOOO to OXFFFF.

When a program to be played back is determined, that is, the data string is determined, the system controller 204 controls the pickup drive section 104, moving the pickup means 103 so as to enable the pickup control of a desired program.

An explanation will be given below about one PIF form of the managing information of the disc where the information is recorded on the format as set out above.

FIG. 4A shows one example of a disc 1 with a moving picture recorded thereon. When the data string #0 is selected at a time of reproduction, an image is reproduced, while playing back an environmental sound and music (B&M). Since, in this case, no voice is produced, any of the data strings #2 to #7 is selected. Voices D2 to D7 are recorded in different languages in the data strings #2 to #7. By doing so, the user can hear a voice in an arbitrary language together with the environmental sound and music while enjoying a given image. D1+B&M in a data column #1 means that, when this data column is selected, a voice of a language defined by D1 is played back together with the environmental sound and music while displaying an image. When this data column #1 is selected, then a voice with a language defined by D1 is played back, together with the environmental sound and music, on a first voice decoder while displaying the image of the video decoder. When any of the other data strings is selected, it is possible to play back a voice with a language selected by a second voice decoder. It is, therefore, possible for the user to hear the voice, for example, in two different languages. Therefore, the reproduction apparatus of the present invention has two decoders to play back at least two voice data strings.

FIG. 4B shows an example of a disc recorded with a kara-ok. When the data #0 is selected, the kara-ok (recorded accompaniment) is played back. If any of the data strings #1 to #7 is selected in that played-back state, then a voice is played back in different languages. For the kara-ok, different texts are often used. At this time, the subtitle is also reproduced in accordance with the text and displayed on the display device. When the user learns a melody by heart, the voice is cut off on the reproduction apparatus and the user enjoys singing a song with only the subtitle displayed in any language.

FIG. 4C is another example of a disc with a kara-ok recorded thereon. With the data string #0 selected, the kara-ok (recorded accompaniment) is played back. If, in this data s-back state, the data string #1 is selected and reproduced, a guide vocal is reproduced so that the user can enjoy a kara-ok in an ordinary audiovisual state. With only the data string #2 reproduced, the user can listen to a melody line alone (this may be done in combination with the reproduction of the data string #0). When the data string #3 is reproduced with the data string #0 in a reproduced state, for example, a male voice is played back in a stereo channel L and a female voice in a stereo channel R. The user can enjoy singing a duet by cutting off either one of these voices.

Though the discs of FIGS. 4B and 4C have been explained separately, their programs can be stored in the same disc.

An explanation will be given below about how an operation is done in a reproduction apparatus in the case of a kara-ok disc.

With the kara-ok disc loaded into the reproduction apparatus, the reproduction apparatus can read out the managing data and, by doing so, identify the kind of disc.

Figure 5A:
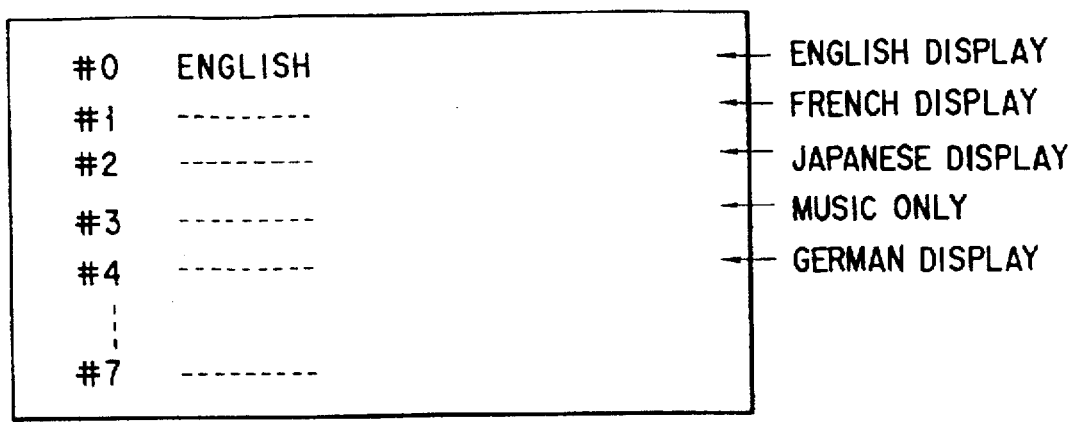
FIGS. 5A to 5C are views showing examples of a display screen of a monitor on the reproduction apparatus.
Figure 5B:
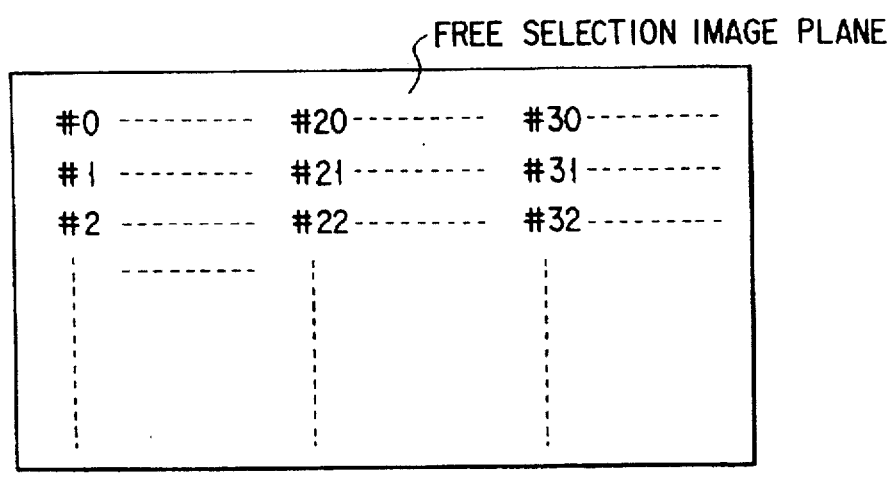
Figure 5C:
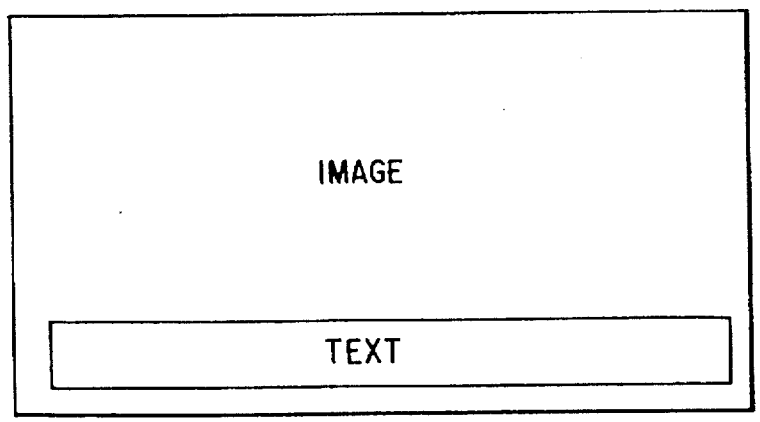

FIG. 5A shows one form of a display on a first menu image plane. For the case of the kara-ok, music alone can be selected through the selection of, for example, #3. If #2 is selected by user, for example, a Japanese language will be designated from the world language menu. Then, a program select image plane emerges on a second menu image plane (FIG. 5B). The user selects a music program of a desired title while viewing the program select image plane. Then as shown in FIG. 5C, the apparatus is placed in a "playing" state with a background image and text being displayed.

In this case, the same language as that in the world language is produced under an automatically selected subtitle.

Figure 6:
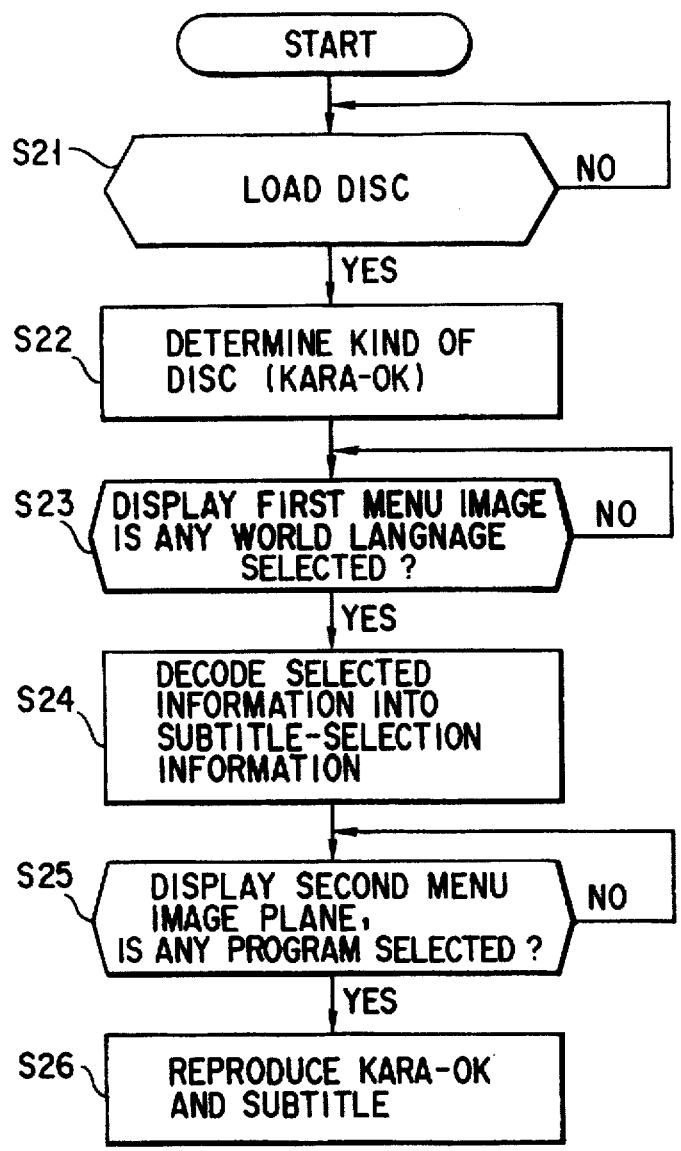
FIG. 6 is a flow chart for explaining an example of an operation of the reproduction apparatus.

FIG. 6 shows a data processing procedure on the reproduction apparatus when a kara-ok program is played back. With the disc loaded into the reproduction apparatus, the kind of the disc is determined in accordance with the content of the managing information VID-steps S21 to S23. Then the first menu image plane (FIG. 5A) is displayed. With the world language selected, a selection code is prepared under a subtitle language corresponding to the selected language. The code of the subtitle language corresponding to the code of the world language is tabulated and stored in the PIF. At step S24, utilizing the code of the selected world language, the code of the corresponding subtitle language is searched and temporarily stored. At step S25, many programs are displayed. Program data may be stored as an image in the data area or stored in the VID area. The program can be selected by inputting the number of a desired program on a keyboard while viewing the menu image plane of FIG. 5B. When the selection of the program is completed, the reproduction apparatus shifts the pickup to an address where the identified program is stored and starts a reproduction process. Further, the selection of the subtitle information enables the reproduction of the subtitle language information corresponding to the selection code (step S25, S26), which is decoded at step S24.

The program has been explained as being selected through the second menu image plane. The program selection is delayed when the next user awaits his or her turn. In the kara-ok playing mode it is possible to select a program through an interruption. In this case, the next user can make a sequential reservation by looking at a program-to-selection number correspondence table (a table given when a disc is bought).

Figures 7A, 7B:
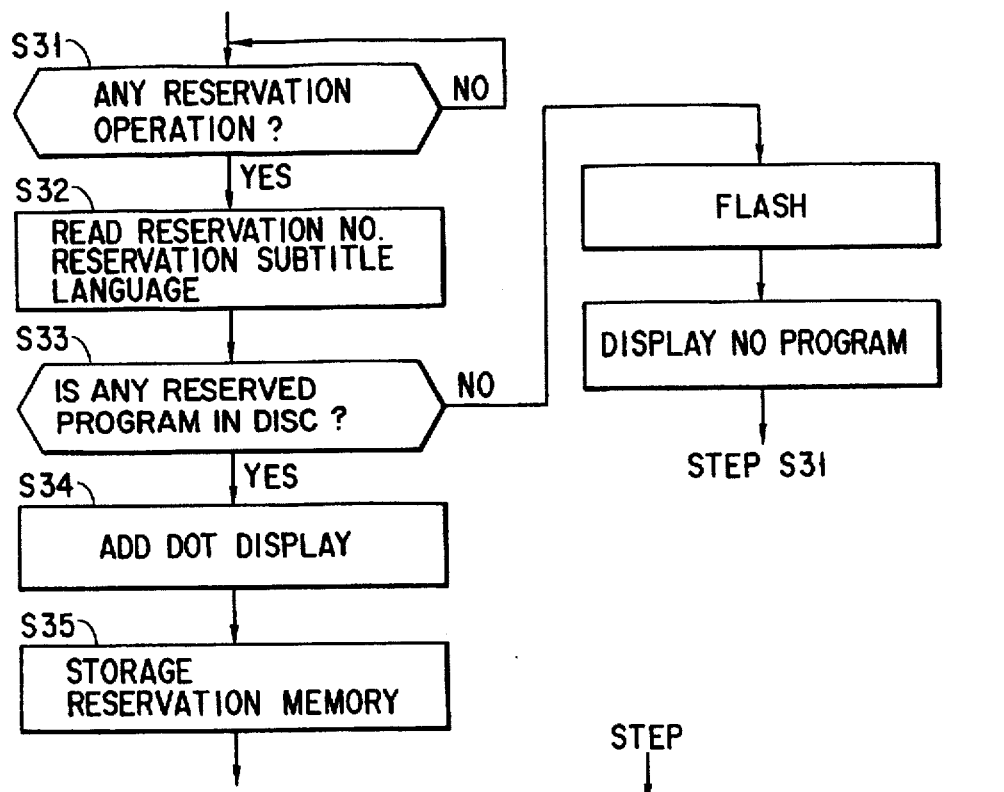
FIGS. 7A and 7B, similarly, is a flow chart showing an example of an operation done by the reproduction apparatus.

FIG. 7A shows a reservation routine.

The determination of whether or not any reservation operation has been effected is conducted as an interruption. If there is any reservation operation, the selection information of the program number and subtitle language are read out as the reservation information. If the selection information of the subtitle language is not entered, then the subtitle language is the same language as the one selected by the present first user (steps S31, S32). When the data of the program reservation number is entered, the apparatus determines whether or not any reserved program is present on the current disc (step S33). If YES, dots are added on a remote-control display section or on a dot array of the video image plane and the program is stored in a reservation memory (steps S34, S35). By doing so, the user can determine the number of programs reserved. In the case where there are many dots representing many programs being reserved, a cancellation key may be provided to cancel the reservation.

If NO, the display is, for example, flashed on and off on the remote-control display section or on the video image screen, informing the user that there is no corresponding program on the current disc.

FIG. 7B shows the steps of processing on the apparatus when the reproduction apparatus has a reservation function. In the case where, at the completion of a reproduction, the next program is selected (reservation information is stored), this program and number are displayed on the display section. The program and number data are stored in the reservation memory provided on the apparatus (steps S41, S42). If no information relating to the next program is present in a work memory, control is returned back to step S25 (FIG. 6), the second menu image plane is displayed and a list of programs are displayed. If there is any reservation information, the corresponding program (program number, title, etc.) is displayed, thus waiting for a start operation (steps S43, S44). When the start operation is effected, the kara-ok and subtitle of the program are played back (steps S44, S45).

FIG. 8 shows a display form of a menu image plane in the case where a kara-ok disc (FIG. 4C) for practice is played back. FIG. 8A shows the first menu image plane where a selection menu of the world languages is displayed. Then the program in a selected world language and its corresponding number are displayed on the second menu image plane (FIG. 8B). If this selection operation is ended, a third menu image plane is displayed as shown in FIG. 8C. The user can select items on the third menu image plane in accordance with its practice contents. If the user wishes to sing a song, for example, to a normal accompaniment, it is only necessary for him or her to depress the #0 key and operate a setting button. If the guide vocal alone is to be reproduced, it is only necessary to depress the #1 key and operate a setting button. In the case where the kara-ok and melody line are to be heard, it is only necessary to depress the #0 and #2 keys and operate the setting button. Even if this disc is played back, it is also possible to operate a sequential reservation function.

An explanation will be made about recording information and functions for specified reproduction particularly effective for learning and searching.

For a disc recording the kara-ok information thereon, various languages and programs can be selected as set out above. Repeat practices and search are made as will be set out below.

Figure 9A:
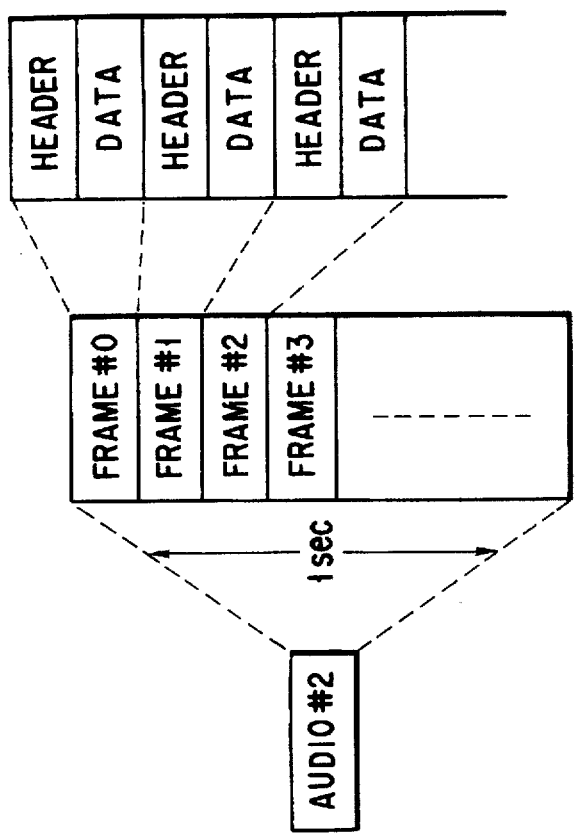
FIGS. 9A and 9B are an explanatory view showing a flag for representing a data area on the disc.
Figure 9B:
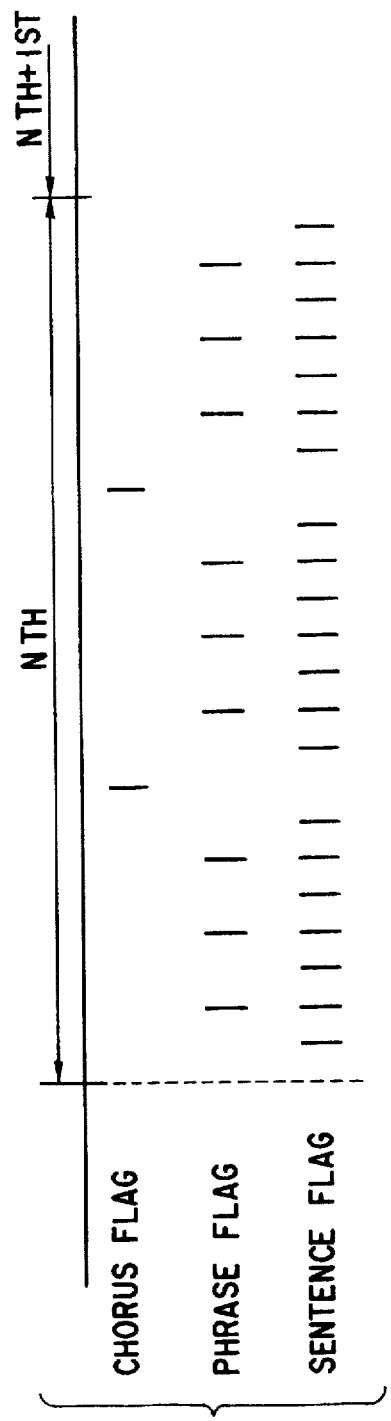

FIG. 9A again shows part of the audio information #2 as shown in FIG. 2. The audio (AUDIO) information is comprised of audio frames (FRAME) which, during reproduction, produce a reproduction sound of about 1 second. Further, the respective audio frame (FRAME) comprises a header (HEADER) and data. Here, chorus flag information is set at the header as shown in FIG. 9B. In the case where an N-th program contains three parts, the above-mentioned chorus flag is set at respective points where first and second parts are ended.

If such a flag is set, it is possible to set a mode, such as "end at the first part", or "end at the second part", on the reproduction apparatus side. By doing so the reproduction apparatus detects the above-mentioned chorus flag and, when the text of the first or second part has ended, it is possible to automatically end the reproduction through "fading-out". Such a function can be used in the case where as many programs as possible are to be reproduced or the turnover of programs is to be increased. This is, for example; the case where, in a kara-ok sing-along bar, many program reservations are requested, or when or a returning-home hour or closing hour is drawing near.

Further, a phrase flag may be provided. For a popular song under the title "journey on a Good Day (I-I-HI TABIDACHI)", there are phrases (1) to (4), reading (1) "Facing toward the northern sky, the melting of lingering snow nearer, and calling back dreams of those past days,"
(2) "I feel those by-gone people come and go across my thrilling heart. I'm going to make a lonely journey just on this day."
(3) "I'm expecting that, somewhere in Japan, there are some people waiting for me."
(4) "I'm going to search for that crimson tinging of the sunset, taking those songs sung by my mother as a companion."

The phrase flag is set to each of head position of these phrases (1) to (4).

Here a "sing a phrase again" key is set to the reproduction apparatus. When this key is turned ON, a return is made from a present playing-back position back to the flag position of the phrase presently being played back to carry out a repeat playback function.

Further, a sentence flag may be set in the reproduction apparatus.

The sentence flag corresponds to a sub-division of an interval of above-mentioned phrase flag. Such a sentence flag can be utilized upon the repetition of words now under study and of sentences and upon the repeated playback of their pronunciation.

Figure 10:
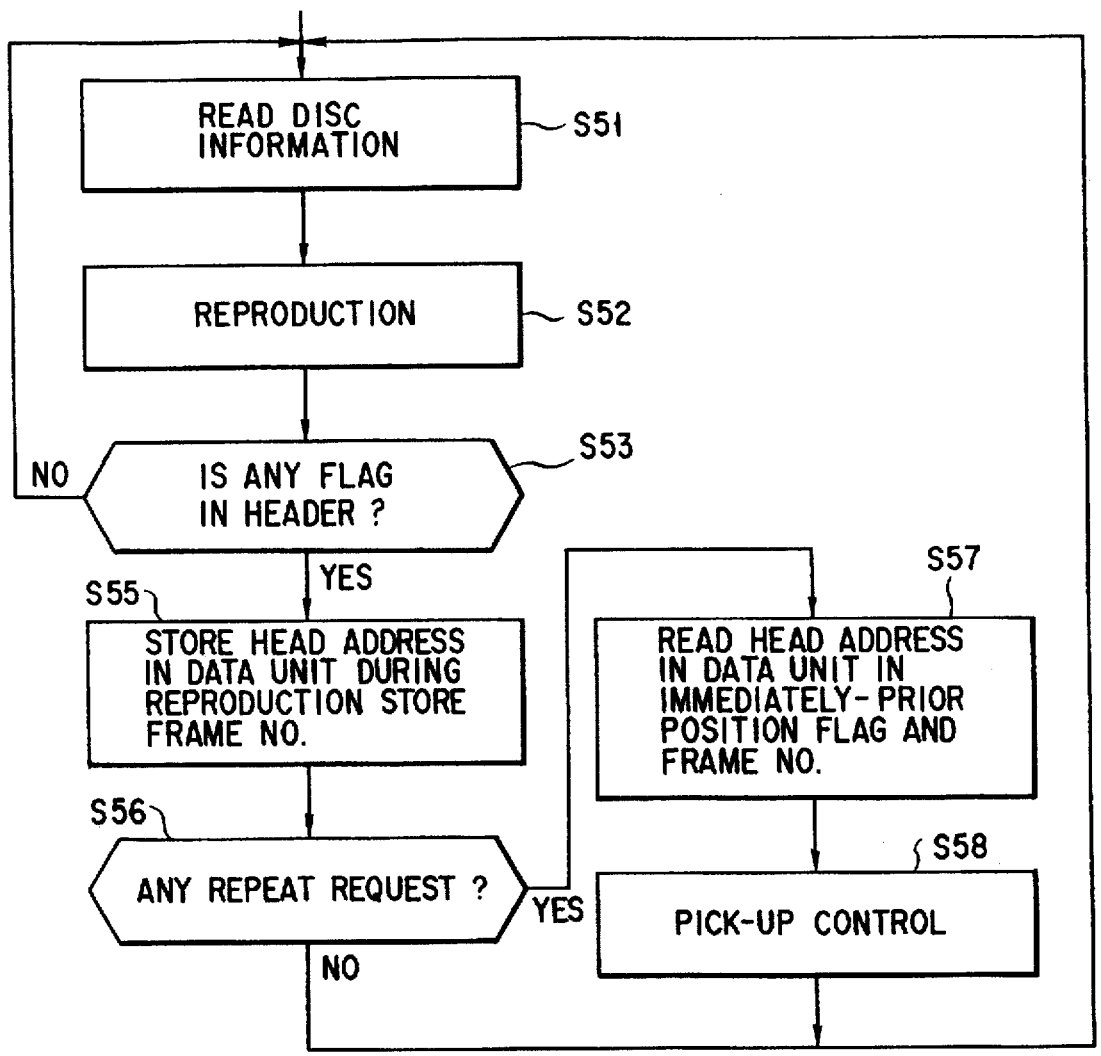
FIG. 10 is a flow chart for explaining an example of an operation done on the reproduction apparatus.

FIG. 10 is a flow chart showing the operation of the reproduction apparatus when a disc with the above-mentioned flags recorded thereon is played back.

When any program to be practiced is determined, corresponding disc information-is read out and reproduction is started (steps S51, S52). It is judged whether or not the above-mentioned flag is present in a played-back signal (step S53). If NO, a playback operation continues. If YES, a corresponding head address in a data unit now under reproduction is stored in a work memory. Then it is determined whether or not there is any repeat request (step S56). If NO, control is returned back to step S51. If YES, the information of the work memory above is read out and the head address in the data unit in an immediately-prior-position flag and frame number are read out (step S58). Based on this address, a corresponding data unit is searched and reproduced (steps S58, S51). Further, audio information on the flag position is played back. If the repeat request is released, the next data is read out and reproduced.

Further, the system of the present invention is equipped with an introduction vocal-part and a bridge-part search function.

There are sometimes cases where, when one hears popular songs, for example, over a radio, his or her favorite program is on the air but the title of the program is not known to him or her. Further, there are also cases where one knows the introduction vocal and bridge parts, but he or she does not know the remaining part of that program. If such a program is to be practiced, he or she cannot search it simply by looking in the program menu. To this end, the system is equipped with introduction vocal-and bridge-part search functions.

The introduction vocal-part search function is directed to searching for introduction parts of many programs recorded on the disc. The bridge-part-search function is directed to searching for only bridge-parts of many programs recorded on the disc.

Figure 12:
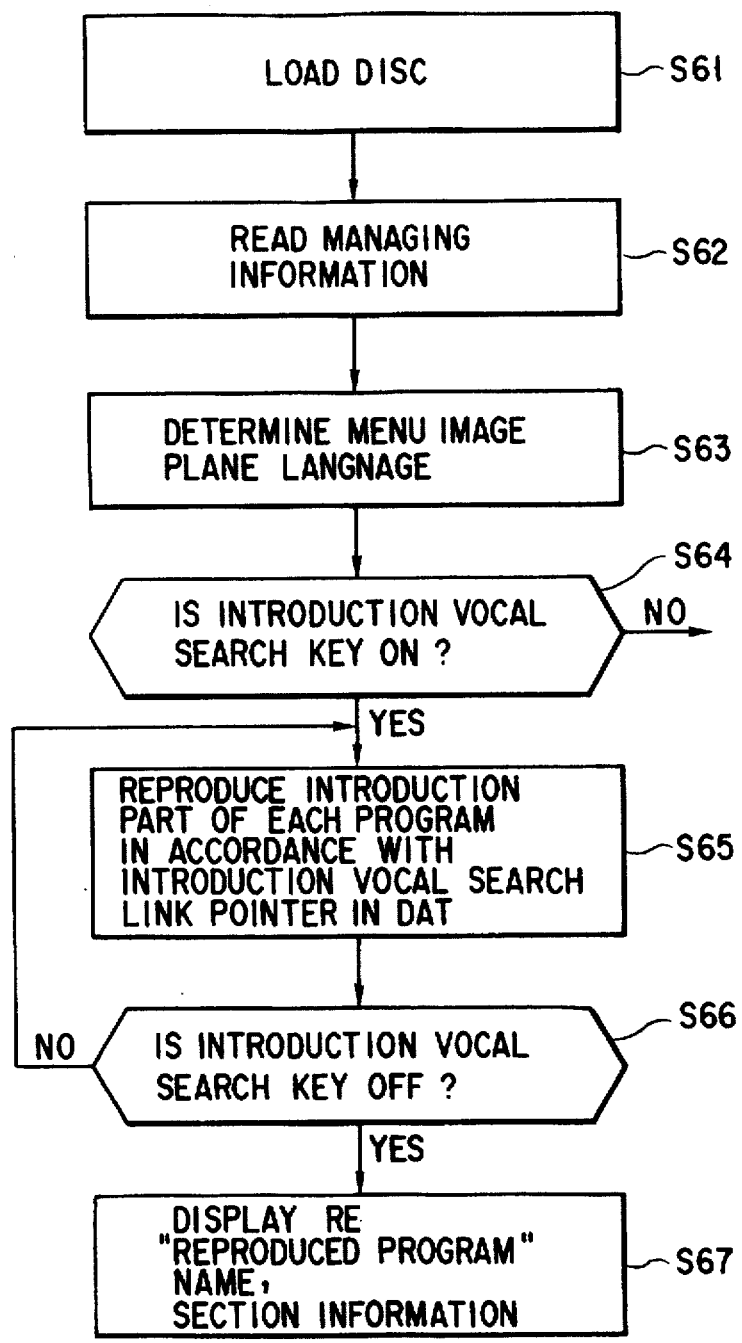
FIG. 12 is a flow chart for explaining an example of an operation done by the reproduction apparatus.

In order to achieve such functions, the reproduction apparatus has managing information as shown, for example, in FIG. 11 and a processing function as shown in FIG. 12. FIG. 11A shows the PIF with data strings set there as set out in conjunction with FIG. 4. The menu image plane is displayed there to allow the program as set out in FIG. 5B to be selected. If the user does not know the title of the program, the introduction vocal-part search key is operated. Then the head information on the search address in the PIF is read out. This system stores the head information on the search address in the PIF Let it be assumed that data string #2 is selected out of the PIF. There the corresponding head information (D2S) is recorded. The reproduction apparatus searches for a data unit number (#5 in the Figure) in the DAT (corresponding to a data unit number in actual practice) corresponding to D2S. Those data unit numbers sequentially reproduced are sequentially recorded as link pointers in the DAT and, further, addresses (a zone number, track number and sector number) and so on in the data unit to be reproduced are also tabulated. Here, the DAT contains a link pointer table in a normal reproduction and a link pointer table across which a search function works. In the case where the introduction vocal-part search key is rendered ON, a link pointer table is utilized which is provided for a search function by doing so, the control position information of the pickup is obtained on the reproduction apparatus and it is possible to determine the data unit to be reproduced.

FIG. 12 shows an example of an operation procedure of the reproduction apparatus when the introduction vocal-part key is turned ON. With the disc loaded, the managing information is read out (steps S61, S62). Then the first menu image plane as shown in FIG. 5A is displayed. Here it is judged whether or not the introduction vocal-part search key is turned ON (step S64). If NO, the second menu image plane as shown in FIG. 5B is shown. With the introduction vocal-part search key ON, link information for introduction vocals in the DAT as shown in FIG. 11B is read out and the reproduction of the data unit is carried out in accordance with the link pointer (step S65). It is judged whether or not the introduction vocal-part search key is turned OFF during any portion of the reproduction (step S66). When the introduction vocal-part search key is not turned OFF, the introduction vocals of respective programs are played back sequentially. When the introduction vocal-part search key is turned OFF, this means that the user has found his or her desired program. At this time, a program now being played back and a number to be designated on the second menu image plane (program number select image plane) are displayed on the display screen.

Although, in the above-mentioned procedure, the data unit is played back in accordance with a link pointer for the introduction vocals of all the DAT, since the link pointer of the head of the introduction vocal in the next program is described in the DAT, it may be possible that reproduction is effected on the reproduction apparatus by determining a time interval (for example, about 10 seconds) from the head of the introduction vocal and, after this time elapses, a shift is made to a reproduction of the introduction vocal-part of the next program. By doing so, it is possible to achieve savings in the amount of information in the DAT.

Although an explanation has been given about the introduction vocal-part search, the same thing can be said for the bridge-part search.

Although a part of a recorded program has been explained as being played back in the reproduction of the introduction vocal-and bridge-part, the present '9. invention is not restricted thereto and the bridge-part and introduction vocal-part may be handled as independent items and recorded, together with music information, in a hierarchical structure.

Figure 13A:
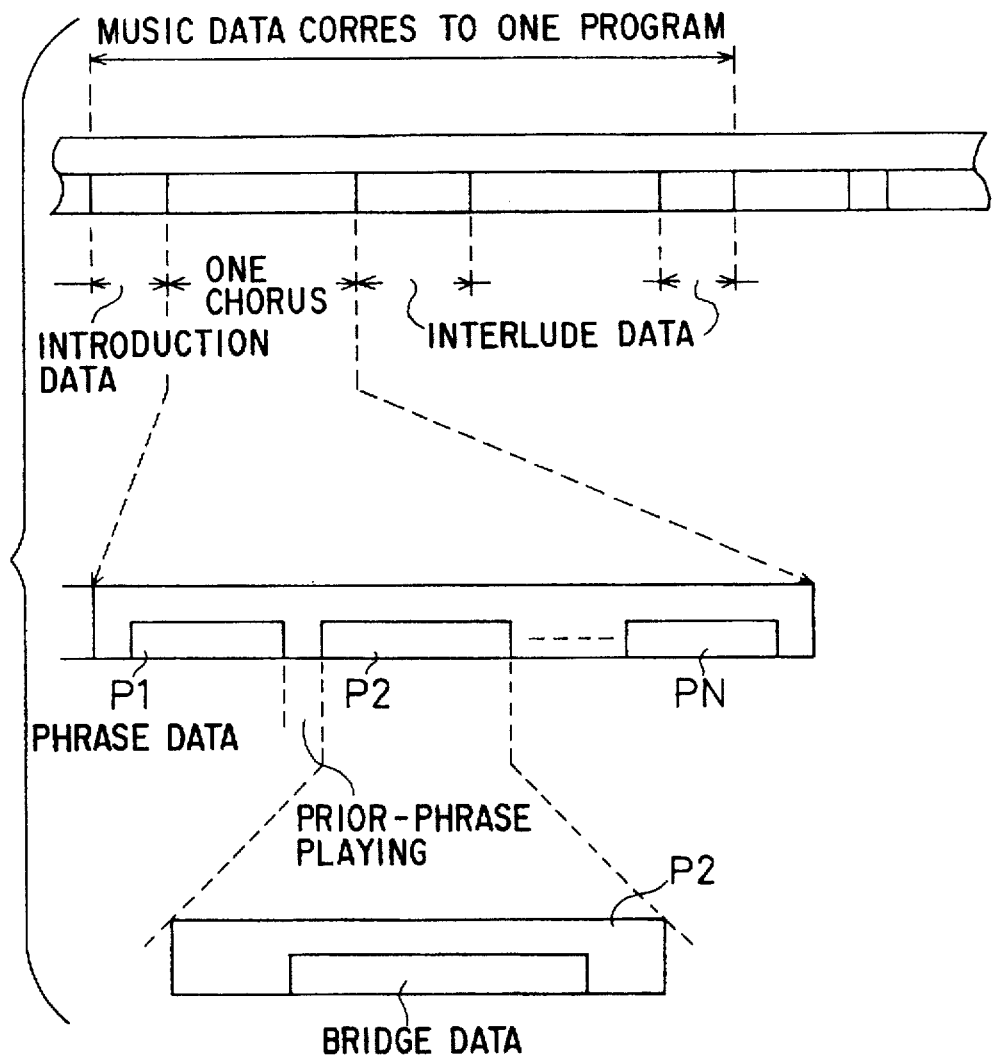
FIGS. 13A and 13B are views showing one form of recorded information on a disc of the present invention.
Figure 13B:
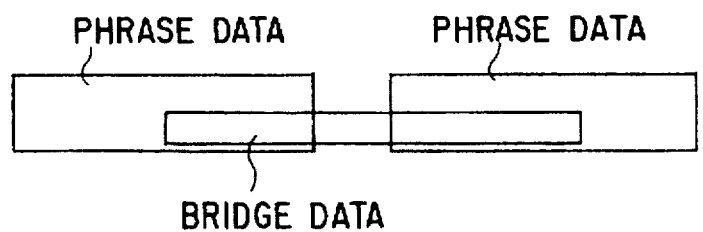

FIG. 13A shows marks on the tracks of music data in one program. The music data comprises, for example, an introduction data part, one chorus part, interlude data part, chorus part and a final interlude data part. The chorus part includes a plurality of phrase data parts P1, P2, ..., PN and the bridge data is independently recorded, for example, on a portion of the phrase data part P2. If, in this way, the bridge part of the program is prepared with audio information corresponding to the producer's intention and independently recorded in the hierarchical structure, then the degree of freedom with which the bridge part is produced is increased without utilizing the data of any music part. It is, therefore, possible to produce well-defined bridge parts without the music being interrupted. FIG. 13B shows an example of the bridge part extending over the phrase data items. The data of a climax part in a music is effective as a bridge data. The length of the bridge data is, therefore, not necessarily determined unconditionally and sometimes differs due to the music and producer's intention. From this view point, if the bridge data is recorded-independently of the music data, it is well defined on reproduction. The bridge data may be built either in the hierarchical structure or in a multiple recording format.

FIG. 14 shows a signal processing procedure upon the reproduction of a bridge part when reproduction is made on a reproduction apparatus with a disc having a plurality of programs recorded thereon.

The scan reproduction of a bridge part is started by an instruction entered in the operation section (steps S71, S72). First, reproduction is made on the bridge part in a first program (steps S73, S74). At this time, the head and end addresses in the first program are read from the managing data read out of the disc and a duration time is determined over which the bridge part is reproduced. Then at step S75, it is determined whether or not a program whose bridge part is played back is a final program. If YES, then the step is ended (step S76) and, if NO, a bridge part in the next program is played back (step S76).

Figure 15A:
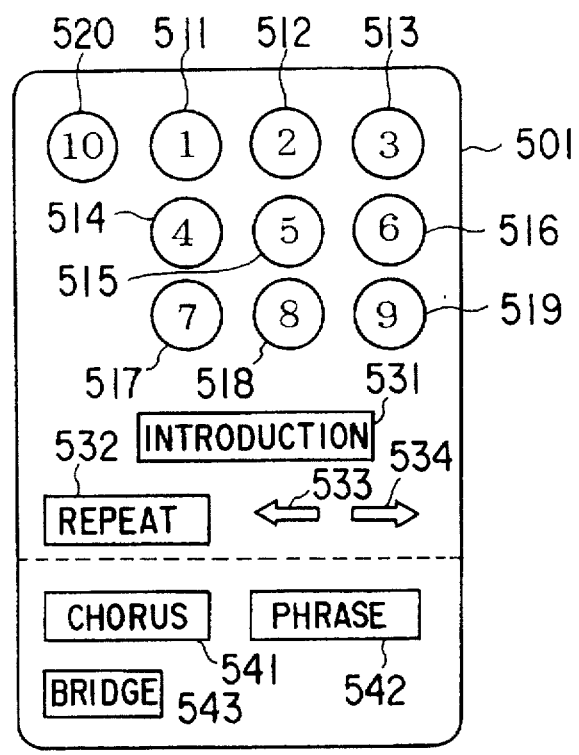
FIGS. 15A and 15B show an example of an operation section on the reproduction apparatus of the present invention.
Figure 15B:
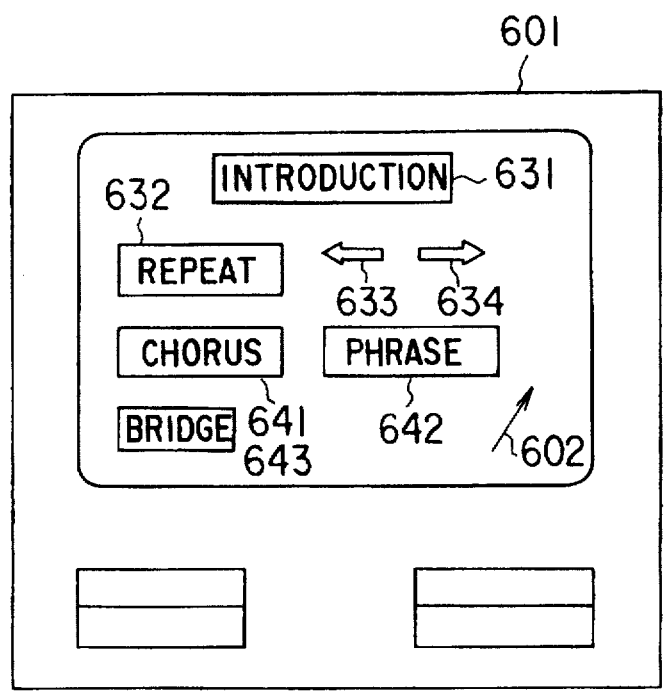

FIGS. 15A and 15B are diagrams for explaining another embodiment of the present invention.

As shown in FIG. 15A, a command display section 501 is provided on an operation section 205 of a reproduction apparatus or on a proximal operation unit of a remote control system. Search keys 511 to 520 are provided on the command display section 501. Music (music data) to be played back can be determined by operating the corresponding key and entering a music number. If, for example, the first music data is played back, all that is necessary is to operate the search key "1".

An introduction designation key 531 is provided on the command display section 501. If only the introduction designation key 531 is operated, the introduction parts of the music data items recorded on the disc are sequentially played back, for example, in units of, for example, 10 seconds. A repeat designation key 532 is provided on the command display section 501. Arrow keys 533 and 534 are provided on the command display section 501 and, with the arrow key 533 or 534 operated, a reproduction state is shifted back to a head of music data currently being played back or is shifted to the next music data. The arrow keys 533 and 534 are considered search keys.

Further, a chorus designation key 541, phrase designation key 542 and bridge designation key 543 are provided on the command display section 501. Here, with both the repeat designation key 532 and chorus designation key 541 operated, the chorus part of a music data now being played back is reproduced repeatedly. If both the repeat designation key 532 and phrase designation key 542 is operated, a phrase part of the music data now being played back is reproduced repeatedly. Further, if both the repeat designation key 532 and bridge designation key 543 is operated, the bridge part of the music data now being played back is reproduced repeatedly.

If the arrow key 533 and chorus designation key 541 is operated, a shift is made back to the head of the chorus now being played back and reproduction is effected from that head. If the arrow key 534 and chorus designation key 541 is operated, a shift is made to the next chorus following the chorus being played back. If the arrow key 533 and phrase designation key 541 is operated, a shift is made back to the head of the phrase being played back and reproduction is effected from the head. If the arrow key 534 and phrase designation key 541 is operated, a shift is made to the next phrase following the phrase being played back and reproduction is effected from the head of the next phrase.

FIG. 15B shows a state in which an operation guide is displayed on a display 601.

Various types of functions can be designated, for example, by moving a cursor 602 by the operation of the remote control section. The display elements include, for example, an introduction designation part 631, repeat designation part 632, arrows 632 and 633, chorus designation part 641, phrase designation part 642 and bridge designation part 643. If the chorus is to be repeated, the cursor 602 is moved to the chorus designation section 642 and a decision button is depressed. Then the cursor 602 is moved to the repeat designation section 632 and the decision button is depressed. This is all that is required in this connection.

Figure 16:
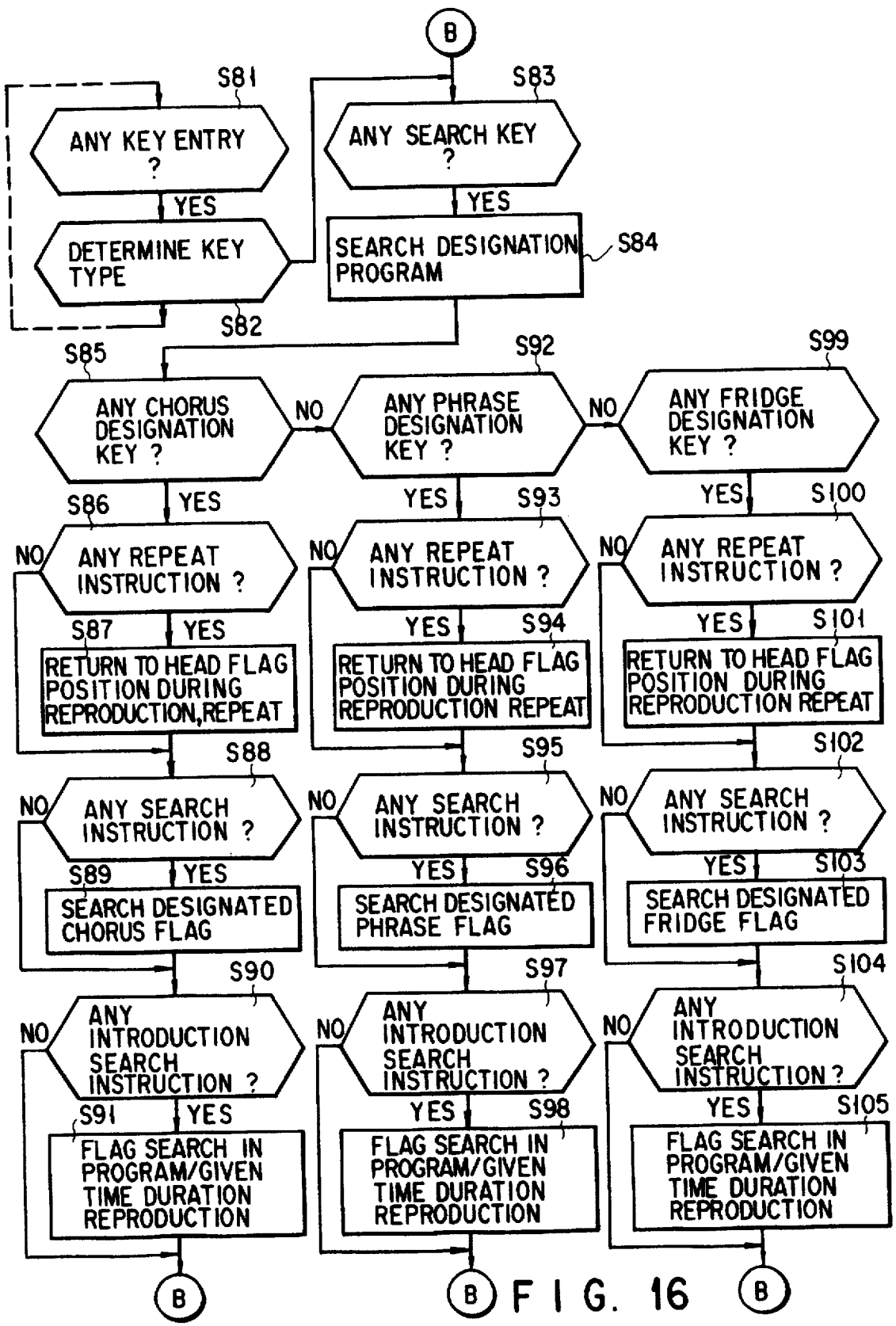
FIG. 16 is a flow chart for explaining an example of an operation done by the reproduction apparatus.

FIG. 16 is a flow chart showing a software for executing data processing in response to the above-mentioned operation. The software is stored in memory in the system controller 204.

When the reproduction of the disc is started, then managing information is read out. With a key entry, the type of key is judged (steps S81, S82). If a command comes from the key as set out in conjunction with FIG. 15A, control is transferred to step S83. At step S83, it is judged whether or not there is a search key entry. If there is a search key entry, then a search is made for a destination music so that reproduction is made (step S84).

If a chorus flag is detected during any portion of a reproduction, a flag address of this chorus flag is stored in the work memory (flag address memory section). When a phrase flag is also detected, this phrase address is also stored in the work memory. When a bridge flag is detected, this bridge address is stored in the work memory. The chorus flag address, phrase flag address and bridge address of at least one music selection are sequentially stored in the work memory. The flag data is composed of a few bits to distinguish the chorus flag, phrase flag and bridge flag from each of the other flags.

Further, during any portion of the reproduction it is judged whether or not there is a key entry. If there is a key entry, it is judged whether or not it is a chorus designation key 541 (step S85) In the case where the chorus designation key 541 is not operated, it is judged whether or not the phrase key 542 is operated (step S92) If the phrase designation key 542 is not operated, it is judged whether or not the bridge designation key 543 is operated (step S92).

If the chorus designation key 541 is operated, it is judged whether or not the repeat designation key 532 is operated in a combined manner (step S86). If the repeat designation key 532 is operated, control is returned back to a head flag position of a chorus now being played back and a repeat mode is done (step S87). If the repeat designation key 532 is not operated, it is judged whether or not any of the arrow keys 533 and 534 is operated and if an arrow key 533 or 534 is operated, then control is returned back to a head side of the chorus being played back so that a reproduction is made, or control is transferred to a head of the next chorus so that a reproduction is carried out (steps S88, S89). If the arrow key 533 or 534 not operated, it is judged whether or not the introduction designation key 531 is operated (step S90). When the introduction designation is made, a search is made for a flag in the music starting with the head of the music and, after a chorus head part has been reproduced for a predetermined time, control is returned back to step S83.

The operations as set out in conjunction with steps S85 to S91 are those done when the chorus designation key and other designation keys (repeat, search, introduction) are operated in any combined manner. Similarly, the operations when the phrase designation key 542 and other designation keys (repeat, search and introduction) are depressed in any combined manner are achieved by processing at steps S92 to S98. In a similar way, the operations when the bridge designation key 543 and other designation keys (repeat, search and introduction) are depressed in any combined manner are achieved by processing at step S99 to Various practical embodiments are possible for a flag address memory section as will be set out below. A flag address is held for storing an area of the designation music data, including the flag, only during a period in which the pickup means performs a read operation. When a new access command is entered on the music data, a held flag address is cleared. Further, a flag address held from the ending of the music data now being played back to the start of a reproduction of the next music data is cleared. Further, during a period in which the access command is entered on the music data and music data corresponding to the access command is read out by the pickup means, the flag address is held.

The present invention is not restricted to the above-mentioned embodiments.

In the embodiment above, an intended object is realized by operating respective kinds of keys in any combined manner. In this case, however, it may be possible to, by any dedicated operation means, reduce the number of times the key is depressed.

As shown in FIG. 17A, a command display section 700 is provided on the operation section 205 of the reproduction apparatus or on the proximal operation unit of the remote control system. Search keys 711 to 720 are provided on the command display section 700 and music (music data) to be played back can be designated by operating the search key and entering a music number. In the case where, for example, first music data is to be played back, it is only necessary to operate the search key "1". Arrow keys 721 and 722 are also provided on the apparatus. With the arrow key 721 operated, reproduction is performed starting from the head of a music selection currently being played back. With the arrow key 722 operated, reproduction is carried out from the next head following the music now being played back.

Distinction frames 730 and 740 are displayed on the command display section 700 to distinguish a phrase mode and a chorus mode. The distinction frame 730 includes an introduction designation key 731, repeat designation key 732 and arrow keys 733, 734. The distinction frame 740 includes an introduction designation key 741, repeat designation key 742 and arrow keys 743 and 744.

If the introduction designation key 731 is operated in the case of the above-mentioned operation means, it is not necessary to perform any phrase designation, and the head of a phrase in the music now being played back is detected on the basis of the flag and it is so done sequentially in units of 10 seconds. If the repeat designation key 732 is operated, it is not necessary to effect a phrase designation and a phrase in the music now being played back is repeated. If the arrow key 733 is operated, a shift is returned back to the head of a phrase being played back. If the arrow key 734 is operated, a shift is made to a head of the next phrase following the phrase now being played back so that a reproduction may be made. If the introduction designation key 741, repeat designation key 741 and arrow keys 743 and 744 are operated, it is not necessary to perform a chorus designation and, regarding the chorus, a shift is made to an introduction reproduction or a repeat or a reproduction position.

FIG. 17A shows a system for automatically distinguishing a phrase mode from a chorus mode while FIG. 17B shows a system for automatically distinguishing a repeat mode from an introduction mode.

A chorus designation key 761, phrase designation key 762 and bridge designation key 763 are provided in a repeat mode distinction frame 760 and, with any of these keys operated, a repeat mode is automatically obtained as a mode corresponding to the respective designation key. A chorus designation key 771, phrase designation key 772 and bridge designation key 773 are provided in an introduction mode distinction frame 770 and, with any of these keys operated, a reproduction mode of an introduction part is automatically obtained as a mode corresponding to the respective designation key.

Figure 18:
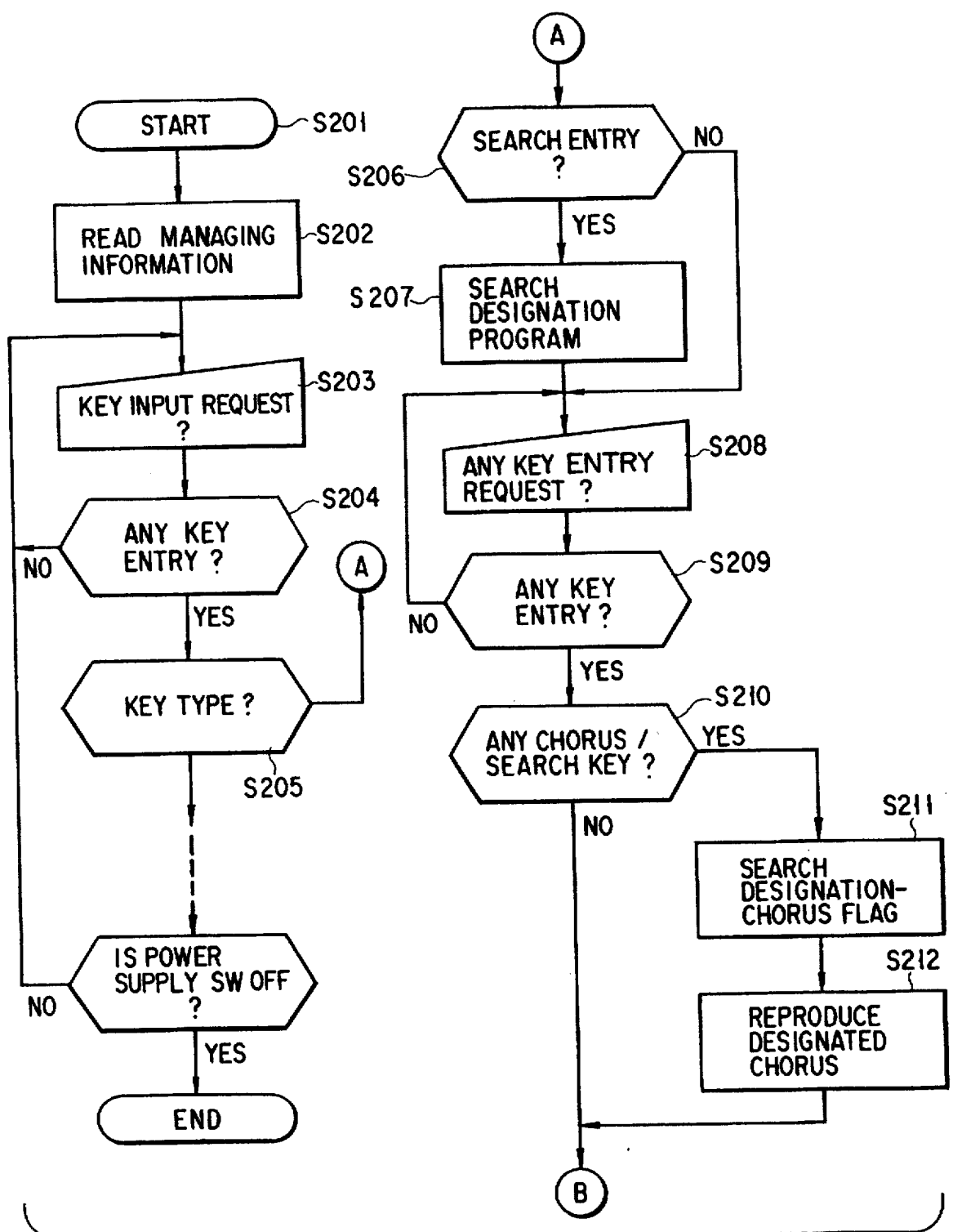
FIG. 18 is a flow chart for explaining an example of an operation on a reproduction apparatus of the present invention.
Figure 19:
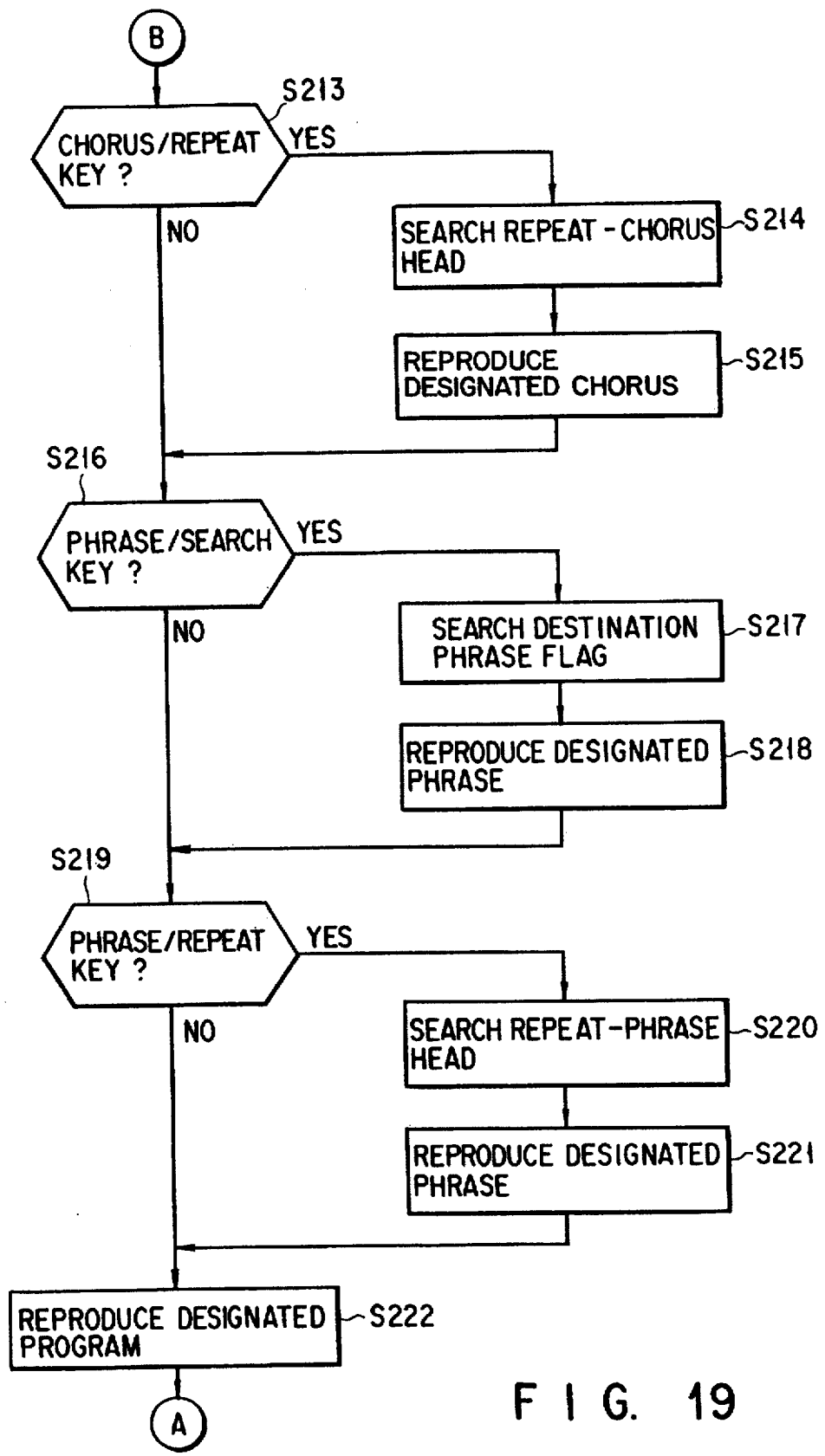
FIG. 19 is a flow chart, continuous with the flow chart of FIG. 18, for explaining the operation done by the reproduction apparatus of the present invention.

FIGS. 18 and 19 show one example of a flow chart which is used when the operation section above is operated. This is an operation flow chart when a repeat designation key and arrow key are operated.

First, a flag address generating means will be explained below. Various kinds of systems can be used as the generation means of the address flag. Though a flag is contained, for example, as a part (chorus unit, phrase unit and bridge unit) of the music data, a system is known where the frame number of an area to which the flag belongs, together with the chorus, phrase and bridge distinguishing information, is stored in the flag address memory section. The chorus, phrase and bridge distinguishing information are stored with their respective flags attached thereto. Further, another system may be used where time counting is done by a counter, starting from the beginning of reproduction of a music selection and, when a flag is detected through the utilization of the time count data, the count data at that time is stored in the flag address memory section. When there is, for example, any designation by the arrow key 733, the pickup means is returned back near to a proper position corresponding to the head of the phrase of a music now being played back. An amount of returning at that time is determined by the difference between the present frame number (or time count data) and the frame number (or time count data) stored in the flag address memory section. Reproduction is performed in a muting state. The muting state is released when the flag is detected.

When reproduction is started on the disc, the managing information is read out (steps S201, S202). When there is a key entry, judgment is made to determine the kind of the keys involved (steps S203 to S205) and, if a command comes from the key as set out in conjunction with FIG. 17A, control is shifted to a step S206. At step S206, it is judged whether or not there is any search key entry. If YES, a search is made for the destination program for playback (step S207).

When a chorus flag is detected during any portion of a reproduction, a flag address of this chorus flag is stored in the work memory (flag address memory section). Further, when the phrase flag is detected, its phrase address is stored in the work memory, and when a bridge flag is also detected, its bridge address is also stored in the work memory. The chorus flag address, phrase flag address and bridge flag address are sequentially stored in the work memory. In order to distinguish between the chorus flag, phrase flag and bridge flag, they each are comprised of flag data having a few bits.

It is judged whether or not there is any key entry during any portion of a reproduction (step S208, S209). If YES, it is judged whether or not it is a search key of a chorus mode (step S210). Further, it is judged whether or not any of the arrow keys 743 and 744 is operated. With, for example, the arrow key 743 entered, a chorus flag address of a music now being played back is read, as a search destination, out of the flag address memory section and the pickup, is moved to its flag address (step S211). Then the designated chorus is played back (step S212).

The flag address generating means can be made of various types of systems. For example, a system is known where a flag is contained in part of the music data and a frame number of an area to which this flag belongs is stored in the flag address memory section. Another system may also be used where time counting is conducted from a start point of a reproduction of a music selection and, when a flag is detected through the utilization of this time count data, the time count data is stored in the flag address memory section. If there is any designation by the arrow key 743, the pickup means is returned back near a proper position. The amount of return at this time is determined by a difference between a present frame number (or the time count data) and a frame number (or the time count data) stored in the flag address memory. Reproduction is performed in a muting state. When the flag is detected, the muting state is released.

Steps S210 and S212 show the operations when the arrow key 743 or 744 is depressed. When there is any designation by the arrow key 744, reproduction is made at high speeds in the muting state, and at the time when the flag of the next chorus is detected, the muting state is released so that a reproduction output may be obtained.

In the case where the arrow key 743 or 744 is not operated, a shift is effected to step 5213 in FIG. 19 and it is judged whether or not the repeat designation key 742 is operated. If YES, then control is shifted to steps S214 and S215 and a repeat destination chorus is played back. In the case where a search is made for the head of a chorus, reference is made to the flag address stored in the flag address memory section as already set out above and a search is conducted for the head of the destination chorus.

In the case where the repeat designation key 742 is not operated in a combined way as already set out above, it is judged, at step S216, whether or not the arrow key 733 or 734 in the phrase mode is operated. If the arrow key 733 or 734 is operated, a shift is made to steps S217 and S218 and a destination phrase is played back. Even in the case where a search is made for the phrase, a phrase flag address is utilized in the same way as the chorus flag address when the search is made for the chorus as set out above.

If the arrow key 733 or 734 is not operated in the phrase mode, control is transferred to step S219. At step S219, it is judged whether or not, in the phrase mode, the repeat designation key 732 is operated. If YES, the destination phrase at steps S220 and S221 is played back. If NO, the destination music is played back at step S222 and a shift is transferred to a step S206 in FIG. 18. In the flow chart as set out above, the path illustrating the process when the introduction designation keys 731 and 741 are operated is omitted.

In order to store the flag address in the flag address memory section in the above-mentioned embodiment, the invention uses a flag address generating means and a means for storing, in the flag address memory section, a flag address generated from the flag address generating means when the flag is detected. However, the present invention is not restricted to such a flag address generating method, and it may be possible that the addresses showing the positions of sub-area data on the medium, such as the chorus, phrase and bridge in the respective music, are initially recorded as flag addresses in the form of a table in the managing information area on the disc. Before music is played back, the flag address of the music is transferred from the managing information to the flag address memory section and, on the basis of this, access is gained to respective area data in music at a time of specified reproduction of the repeat, search, introduction search, etc.

Further, according to the present invention, it is possible to add the following function to the apparatus.

As shown in FIG. 20, it may be possible to provide a display means so as to see a mode on reproduction. FIG. 20A is a display state in which a music is normally played back and FIG. 20B is a state in which a bridge part is played back.

INDUSTRIAL APPLICABILITY

As set out above, according to the present invention, it is easy to reproduce recorded information on a disc and, in particular, perform a partial reproduction in a repeated fashion. An apparatus above is convenient to learn and is proven effective for reproducing a plurality of programs as recorded information on the disc, while picking up only specified portions, and for effecting a program search while viewing a display unit. The present invention can be effectively applied to an apparatus handling a disc type recording medium and to an accessing apparatus.

We claim:

1. A recording medium for selective reproduction of data comprising:

a disc having a managing area formed as one area of the disc and area data formed in the other area, the area data including a plurality of data units, the respective data units having a block with audio information having a flag to represent a demarcation mark which divides voice information into units of at least one of chorus units, phrase units, and sentence units, and the managing area having address information for the respective data units.

2. A recording medium for selective reproduction of data comprising:

a disc having a managing area formed as one area of the disc and area data formed in the other area, the area data including a plurality of programs, the respective programs being comprised of a plurality of data units, the respective data units having a block with audio information, and the managing area having address information for the respective data units and address information for sequentially searching for at least one of introduction vocal-parts and bridge-parts of the audio information in the plurality of programs.

3. The recording medium according to claim 1 or 2, wherein the audio information constitutes music information for kara-ok.

4. A reproduction apparatus for reproduction of a disc having a managing area formed as one area of the disc and area data formed in the other area, the area data including a plurality of data units, the respective data units having a block with audio information, the audio information having a flag to represent a demarcation mark which divides voice information into units of at least one of chorus units, phrase units, and sentence units, and the managing area having address information for the respective data units, the apparatus comprising:

pickup means for reading the information from the disc;

demodulating means for demodulating an output signal from the pickup means;

managing information storing means for storing the managing information which is output from the demodulating means;

audio processing means for decoding the audio information which is output from the demodulating means;

memory means for storing, as a flag position address by reference to a memory address of the managing information storing means, an address in the data unit being reproduced when the flag of the audio information from the demodulating means is detected, indicating the presence of a division between chorus units, phrase units, or sentence units; and means for, when a repeat request signal is entered, changing a reproduction position on the disc on the basis of the flag position address.

5. A reproduction apparatus for reproduction of a disc having a managing area formed as one area of the disc and area data formed in the other area, the area data including a plurality of data units, the respective data units having a block with audio information, and the managing area having, as managing information, address information recorded for the respective data units and search address information for sequentially searching for at least one of introduction vocal-parts and bride-parts of the audio information in a plurality of programs, the apparatus comprising:

pickup means for reading the information from the disc;

demodulating means for demodulating an output signal from the pickup means;

managing information storing means for storing the managing information which is output from the demodulating means;

audio processing means for controlling the pickup means by referencing the search address information of the managing information storing means and for reproducing at least one of said introduction vocal-parts or bridge parts of the audio information in given programs when a search request signal requesting a search for at least one of said introduction vocal-parts and bridge-parts is entered; and means for, when the search request signal is rendered OFF, displaying identification information of a program being reproduced.

6. A recording medium for selective reproduction of specified data, comprising a managing area formed as one area of the disc and a data area formed as the other area, the data area including at least one program or a plurality of programs of music information, the music information including as a sub-hierarchical structure a plurality of data blocks which represent at least one of introduction vocal-parts and bridge-parts of the music information, and the data block having a flag to represent the location of said introduction vocal-parts and bridge-parts; and the managing area including, as managing information, address information for searching for the data block.

7. A reproduction apparatus for reproduction of a disc having a managing area formed on one portion of the disc and area data formed in the other portion, the area data including a plurality of programs of music information, the music information including, as a sub-hierarchical data structure, a plurality of data blocks which represent at least one of introduction vocal-parts and bridge-parts of the music information, the data block having a flag added to represent the location of said introduction vocal-parts and bridge-parts, and the managing data including, as managing information, address information for searching for the data block, the apparatus comprising:

pickup means for reading out the information on the disc;

demodulating means for demodulating an output signal from the pickup means;

managing information storing means for storing the managing information which is output from the demodulating means;

decoding means for decoding the music information which is output from the demodulating means;

audio processing means for reproducing the plurality of data blocks in the music information;

address storing means for storing, as a flag position address by referencing the stored address of the managing information storing means, an address in the data block being reproduced when a flag in the data block of the music information from the demodulating means is detected, indicating the location of said introduction vocal-parts or bridge-parts; and means for repeated reproducing a designated block of the plurality of data blocks on the basis of the flag position address when a repeat reproduction request signal is entered.

8. A recording medium comprising music data, together with their addresses, recorded thereon, wherein the music data includes a plurality of area data which divide the music data into units of at least one of chorus units, phrase units, and sentence units, or which divide at least one of introduction vocal-parts and bridge-parts of the music data from the rest of the music data, the plurality of area data including flags for distinguishing one kind of area data from another.

9. An apparatus for reproduction of a recording medium including music data, together with their addresses, recorded thereon, the music data including a plurality of area data which divide the music data into units of at least one of chorus units, phrase units, and sentence units, or which divide at least one of introduction vocal-parts and bridge-parts of the music data from the rest of the music data, the plurality of area data including flags for distinguishing one kind of the area data from another, and managing information including data for representing a recording position of the music data on the recording medium, the apparatus comprising:

pickup means for reading the music data from the recording medium;

storing means for storing the managing information reproduced;

address generating means for generating a reproduction position address when the music data is reproduced;

flag address storing means for storing the reproduction position address as a flag address when the music data is reproduced and for outputting a flag to distinguish the type of area data; and searching means for searching for the music data on the basis of the managing information when access is gained to the music data by the pickup means and for determining and searching for the data area on the basis of the flag address when access is gained to the data area.

10. The apparatus according to claim 9, wherein the flag address storing means holds a stored flag address only during a period in which the area of the music data including the flag is read out by the pickup means.

11. The apparatus according to claim 10, wherein the flag address storing means clears the held flag address when a new command of access to the music data is entered.

12. The apparatus according to claim 10, wherein the flag address storing means clears the flag address which is held from the ending of a currently reproducing music data until the next music data is reproduced.

13. The apparatus according to claim 10, wherein the flag address storing means stores the flag address during a period from an entry of a command of access to the music until the pickup means reads out music data corresponding to the access command.

14. An apparatus for reproduction of a recording medium having music data, together with their addresses, recorded thereon, the music data including a plurality of area data which divide the music data into units of at least one of chorus units, phrase units, and sentence units, or which divide at least one of introduction vocal-parts or bridge-parts of the music data from the rest of the music data, the plurality of area data being stored together with flags for distinguishing one kind of area data from another, and managing information including data for representing a recording position of the music data, the apparatus comprising:

pickup means for reading the music data from the recording medium;

storing means for storing the managing information reproduced;

address generating means for generating a reproduction position address when the music data is reproduced;

flag address storing means for storing the reproduction position address as a flag address when the music data is reproduced and for producing a flag for distinguishing one kind of area data from another;

dedicated access command inputting means for gaining access to the plurality of area data in the music data or specified area data; and searching means for determining the type of contents being reproduced on the basis of an access command from the access command inputting means and for determining, or searching for, the area data to be accessed on the basis of the flag address.

15. An apparatus for reproduction of a recording medium having music data, together with their addresses, recorded thereon, the music data including a plurality of area data which divide the music data into units of at least one of chorus units, phrase units, and sentence units, or which divide at least one of introduction vocal-parts or bridge-parts of the music data from the rest of the music data, the plurality of area data being recorded with flags for distinguishing one kind of area data from another, and managing information recorded thereon and including data for representing a recording position of the music data on the recording medium, the apparatus comprising:

pickup means for reading the music data from the recording medium;

storing means for storing the managing information reproduced;

address generating means for generating a reproduction position address when the music data is reproduced;

flag address storing means for storing the reproduction position address as a flag address when the music data is reproduced and for outputting the flag for distinguishing one kind of area data in the music data from another;

access command inputting means for inputting a command by operating a plurality of keys to gain access to the plurality of area data, or specified area data, in the music data; and search means for determining the type of contents being reproduced on the basis of an access command from the access command inputting means and for determining, or searching for, the area data to be accessed on the basis of the flag address.

16. The apparatus according to claim 14 or 15, wherein that the command from the access command inputting means comprises a composite for designating a format of reproduction and kind of the area data in the music.

17. An apparatus for reproduction of a recording medium having music data, together with their addresses, recorded thereon, the music data including a plurality of area data which divide the music data into units of at least one of chorus units, phrase units, and sentence units, or which divide at least one of introduction vocal-parts and bridge-parts of the music data from the rest of the music data, and managing information recorded thereon including data representing the recording position of the music data in the recording medium, the kind of area data and their recording position, the apparatus comprising:

pickup means for reading the managing information and music data from the recording medium;

storing means for storing the managing information reproduced;

access command inputting means for inputting an access command for gaining access to the plurality of area data, or specified area data, in the music data;

searching means for determining the type of contents being reproduced on the basis of the access command from the access command inputting means and for determining, or searching for, the area data to be accessed on the basis of the data stored in the storing means representing the recording position of the area data.

18. The apparatus according to claim 17, wherein the command from the access command inputting means comprises a composite for designating a reproduction format and kind of the area data in the music.

19. An apparatus for reproduction of a recording medium on which data units to be reproduced are recorded thereon together with their addresses, the data units each having a hierarchical data structure and including a plurality of specified area data, the recording medium further having managing information which is recorded thereon and including data representing recording positions of the data units in the recording medium, a data type of the respective specified area data, and a recording position thereof, the apparatus comprising:

pickup means for reading the data units from the recording medium;

storing means for storing the managing information reproduced;

access command inputting means for executing a composite operation to generate a command for selecting a desired type of specified area data from the plurality of specified area data and gaining access thereto, and for generating a composite command to reproduce the selected specified area data in a desired reproduction manner;

searching means for determining the type of the specified area data to be reproduced and a manner for reproduction thereof on the basis of the composite command generated by the access command inputting means, for determining the specific area data to be accessed on the basis of data representing a recording position of the specified area data, and for determining a searching manner for searching the specified area data.

20. A reproduction apparatus according to claim 19, wherein the data units to be reproduced each include music data, the specified area data each comprising at least two of the group containing chorus, phrase, sentence, introduction vocal-part, and bridge-part of the music data, and wherein the composite command generated by the access command inputting means includes a command for designating the desired type of the specified area data and a command for determining whether sequential reproduction or repeating reproduction is to be performed.

21. A reproduction apparatus according to claim 20, Wherein the data units to be reproduced each include sub-picture data, audio data, and video data, and the reproduction apparatus further comprises a processing section for processing the sub-picture data, an audio data processing section for processing the audio data, and a video processing section for processing the video data.

* * * * *